(12) United States Patent
Meyers

(10) Patent No.: US 10,356,150 B1
(45) Date of Patent: Jul. 16, 2019

(54) AUTOMATED REPARTITIONING OF STREAMING DATA

(71) Applicant: Amazon Technologies, Inc., Reno, NV (US)

(72) Inventor: Ian Matthew Gary Meyers, East Molesey (GB)

(73) Assignee: Amazon Technologies, Inc., Reno, NV (US)

(*) Notice: Subject to any disclaimer, the term of this patent is extended or adjusted under 35 U.S.C. 154(b) by 88 days.

(21) Appl. No.: 14/570,937

(22) Filed: Dec. 15, 2014

(51) Int. Cl.
*G06F 15/16* (2006.01)
*H04L 29/06* (2006.01)

(52) U.S. Cl.
CPC .................. *H04L 65/608* (2013.01)

(58) Field of Classification Search
CPC ..... H04L 65/608; H04L 67/1097; G06F 3/06; G06F 11/1471; G06F 11/3433; G06F 11/3485; G06F 17/30
USPC .................................................. 709/231, 217
See application file for complete search history.

(56) References Cited

U.S. PATENT DOCUMENTS

| | | | |
|---|---|---|---|
| 7,386,586 B1 | 6/2008 | Headley et al. | |
| 7,716,186 B2 | 5/2010 | Cannon et al. | |
| 8,161,255 B2 | 4/2012 | Anglin et al. | |
| 8,255,730 B2 | 8/2012 | Tatsumi | |
| 8,255,739 B1 | 8/2012 | Chatterjee et al. | |
| 8,276,154 B2 | 9/2012 | Toub et al. | |
| 8,359,596 B2 | 1/2013 | Kobayashi et al. | |
| 8,386,631 B2 | 2/2013 | Nilsson et al. | |
| 8,386,771 B2 | 2/2013 | Baker et al. | |
| 8,463,633 B2 | 6/2013 | Jung et al. | |
| 8,488,661 B2 | 7/2013 | Menon et al. | |
| 8,543,746 B2 | 9/2013 | Roever | |
| 8,572,091 B1 | 10/2013 | Sivasubramanian et al. | |
| 8,712,963 B1* | 4/2014 | Douglis ............. | G06F 11/2094 707/625 |
| 8,856,374 B2 | 10/2014 | Uhlig et al. | |
| 2005/0108362 A1* | 5/2005 | Weinert ................. | H04L 67/10 709/217 |
| 2005/0165972 A1 | 7/2005 | Miyata et al. | |

(Continued)

OTHER PUBLICATIONS

U.S. Appl. No. 14/077,173, filed Nov. 11, 2013, Marvin Michael Theimer.

(Continued)

*Primary Examiner* — Hamza N Algibhah
*Assistant Examiner* — Hannah S Wang
(74) *Attorney, Agent, or Firm* — Robert C. Kowert; Meyertons, Hood, Kivlin, Kowert & Goetzel, P.C.

(57) ABSTRACT

An automated repartitioning agent (ARA) of a storage service determines a repartitioning plan for a storage object. The plan identifies a source set of partitions whose keys are to be distributed among a target number of partitions. The ARA generates a data structure representing the source set, with entries indicating the key sets of corresponding partitions. The ARA implements repartitioning iterations until the keys of the source set have been redistributed. In each iteration, the ARA compares the key set of a selected entry of the data structure with a target key set and performs repartitioning actions based on the result. The repartitioning action may include splitting the selected entry's partition, merging the selected entry's partition with another partition, or designating the selected entry's partition as acceptable.

21 Claims, 12 Drawing Sheets

(56) References Cited

U.S. PATENT DOCUMENTS

| | | | |
|---|---|---|---|
| 2007/0250835 A1 | 10/2007 | Kobayashi et al. | |
| 2009/0125362 A1 | 5/2009 | Reid et al. | |
| 2010/0025714 A1 | 2/2010 | Hsu et al. | |
| 2010/0106934 A1* | 4/2010 | Calder | G06F 3/0605 711/173 |
| 2010/0205588 A1* | 8/2010 | Yu | G06F 9/52 717/149 |
| 2011/0161291 A1 | 6/2011 | Taleck et al. | |
| 2012/0066337 A1 | 3/2012 | Wu et al. | |
| 2012/0143873 A1* | 6/2012 | Saadat | G06F 17/30584 707/741 |
| 2012/0265890 A1 | 10/2012 | Carlson et al. | |
| 2012/0311581 A1* | 12/2012 | Balmin | G06F 9/5066 718/100 |
| 2013/0073724 A1 | 3/2013 | Parashar et al. | |
| 2013/0204990 A1* | 8/2013 | Skjolsvold | G06F 9/5077 709/223 |
| 2015/0125042 A1* | 5/2015 | Haden | G06K 9/325 382/105 |
| 2015/0254325 A1* | 9/2015 | Stringham | G06F 17/30584 707/737 |
| 2017/0235642 A1* | 8/2017 | Madiraju Varadaraju | G06F 11/1451 |

OTHER PUBLICATIONS

U.S. Appl. No. 14/136,624, filed Dec. 20, 2013, Marvin Michael Theimer.

U.S. Appl. No. 14/136,645, filed Dec. 20, 2013, Marvin Michael Theimer.

U.S. Appl. No. 13/942,618, Carl Bellingan, filed Jul. 15, 2013.

Alejandro Abdelnur, "Oozie Specification, a Hadoop Workflow System," Oct. 8, 2010, retrieved from http://rvs.github.com/oozie/releases/2.2.1/ WorkftowFunctionaiSpec.html on Feb. 11, 2013. pp. 1-37.

Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.

"Oozie—Design," retrieved from http://rvs.github.com/oozie/design.html on Feb. 11, 2013. pp. 1-2.

"Quartz Scheduler 2.1.x Documentation," retrieved from http://quartz-scheduler.org/files/documentation/Quartz-2.1.x-Documentation.pdfon Feb. 11, 2013. pp. 1-140.

U.S. Appl. No. 13/764,716, filed Feb. 11 ,2013, Kathryn Marie Shih et al.

U.S. Appl. No. 13/764,711, filed Feb. 11, 2013, Kathryn Marie Shih et al.

U.S. Appl. No. 61/738,967, filed Dec. 18, 2012, Kathryn Marie Shih et al.

U.S. Appl. No. 13/465,944, filed May 7, 2012, Jonathan 8. Corley et al.

U.S. Appl. No. 13/465,978, filed May 7, 2012, Jonathan 8. Corley et al.

U.S. Appl. No. 13/476,987, filed May 21, 2012, Jacob Gabrielson et al.

Apache Kafka, "A High-Throughput Distributed Messaging System", pp. 1-42, Oct. 8, 2013.

Amazon Web Services, "Amazon Simple Queue Service (Amazon SQS)", pp. 1-5, Oct. 8, 2013.

Apache Software Foundation, "Hadoop Streaming", pp. 7-17, 2008.

Sigmod Record, "Parallel Data Processing with MapReduce: A Survey", Kyong-Ha Lee, et al., pp. 11-20, Dec. 2011.

Splunk Inc., "Splunk for Application Management", pp. 1-2, 2012.

GitHub, "Rationale", pp. 1-2, Oct. 8, 2013.

GitHub, "Tutorial", pp. 1-8, Oct. 8, 2013.

U.S. Appl. No. 14/077,171, Marvin Michael Theimer, filed Nov. 11, 2013.

U.S. Appl. No. 14/077,167, Marvin Michael Theimer, filed Nov. 11, 2013.

U.S. Appl. No. 14/077,162, Marvin Michael Theimer, filed Nov. 11, 2013.

U.S. Appl. No. 14/077,158, Marvin Michael Theimer, filed Nov. 11, 2013.

"Kafka 0.8.1 Documentation", Apache Kafka, accessed Dec. 3, 2014, pp. 1-58.

"Amazon Kinesis Service API Refernce", Amazon web services, Dec. 2, 2013, pp. 1-44.

* cited by examiner

US 10,356,150 B1

AUTOMATED REPARTITIONING OF STREAMING DATA

BACKGROUND

As the costs of data storage have declined over the years, and as the interconnection capabilities of various elements of the computing infrastructure have improved, more and more data pertaining to a wide variety of applications can potentially be collected and analyzed. For example, mobile phones can generate data indicating their locations, the applications being used by the phone users, and so on, at least some of which can be collected and analyzed in order to present personalized information that may be helpful to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies, including services to handle streaming data. Using such storage services, large amounts of data can be stored with desired levels of durability, availability and performance.

Despite the availability of virtualized computing and/or storage resources at relatively low cost from various providers, however, the effort required to manage growing collections of streaming data records remains a challenging proposition for a variety of reasons. In some cases, the records of a given stream may be distributed into partitions based on values of selected attributes of the records, where the number of initial partitions and/or the attributes may be selected by the customer on whose behalf the stream is being set up at the stream management service. The data records belonging to each of the partitions may be collected, stored and/or made accessible at respective sets of service nodes (e.g., at distinct hardware hosts or servers) in an effort to balance the workload. However, as the workload changes over time, the initial number of partitions of a given stream may eventually prove to be sub-optimal. Depending on the kinds of programmatic interfaces supported by the stream management service, it may not always be straightforward for the customers of the service to re-partition the stream appropriately.

Figure 1:
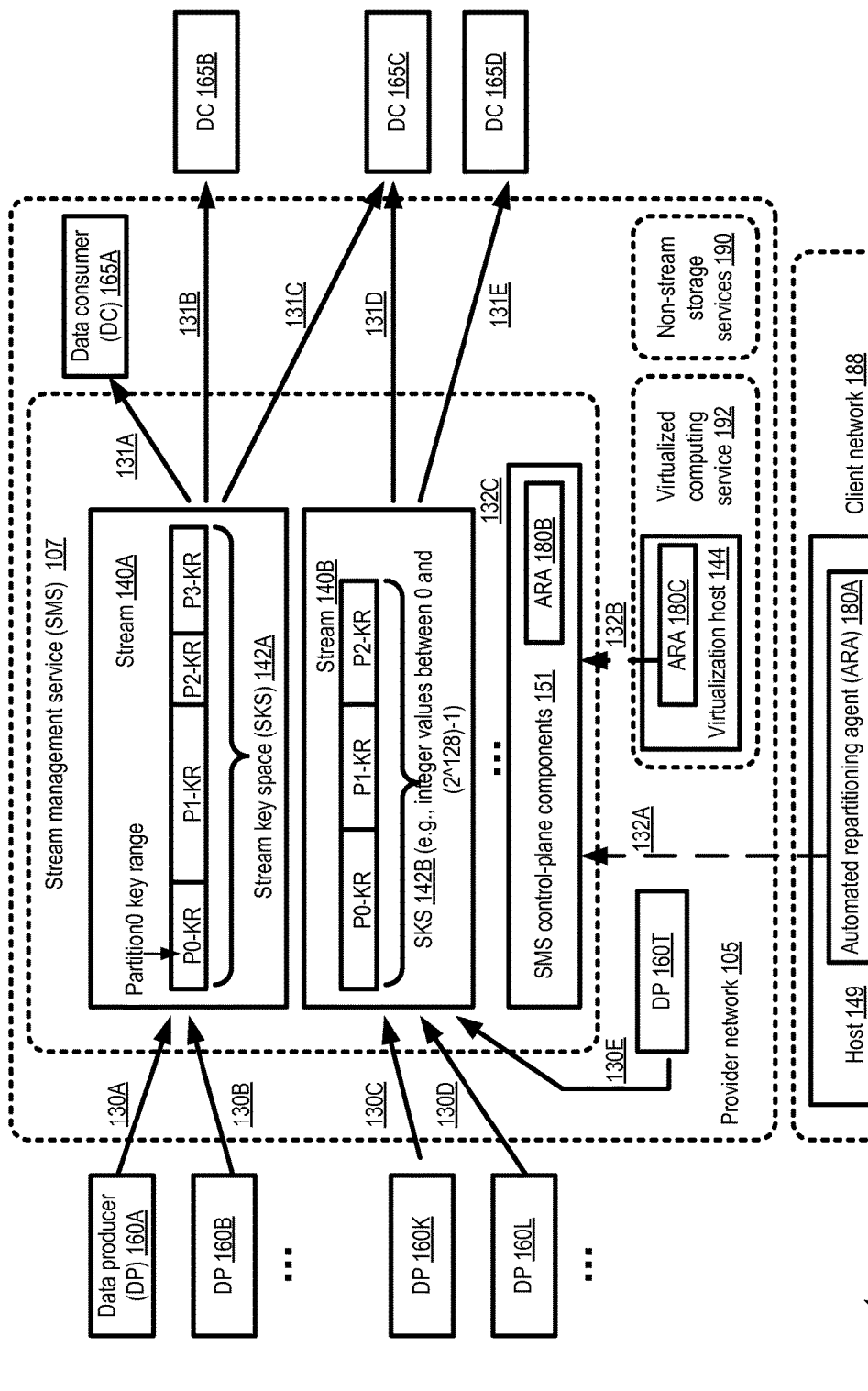
FIG. 1 illustrates an example system environment in which automated repartitioning of streams may be supported by a stream management service of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing automated repartitioning and rebalancing of data stream objects stored at a provider network's stream management service (SMS) are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Some provider networks may also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Storage services that allow clients to store and retrieve arbitrary amounts of data using block-level device interfaces, web services interfaces and the like may also be implemented in a multi-tenant manner at a provider network in some embodiments. For example, a multi-tenant SMS may utilize a given hardware server to ingest, store, or respond to retrieval requests directed to the records of a plurality of data streams established on behalf of respective customers. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In some embodiments, an SMS of a provider network may support one or more sets of programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. The term "stream", as used herein, refers to a sequence of data records that may be generated by one or more data producers and accessed by one or more data consumers, where each data record is assumed to be an immutable sequence of bytes. Some types of stream operations (such as stream creation or deletion, or the kinds of repartitioning operations described below) that involve interactions with SMS administrative components may be referred to as "control-plane" operations herein, while operations such as data record submissions, storage and retrievals that typically (e.g., under normal operating conditions) do not require interactions with administrative components may be referred to herein as "data-plane" operations.

In various embodiments, a particular stream may eventually comprise far more data than can be stored effectively at any given host or server of the provider network. Accordingly, the data records of a given stream may be distributed among a plurality of partitions, with respective sets of SMS resources assigned for each partition. The partition to which a given data record belongs may be selected on the basis of the values of one or more attributes of the data record in various embodiments. For example, in one embodiment a value of a particular attribute (which may be referred to as a partitioning attribute) of a given data record may be provided as input to a function which produces a positive integer that can be used as a key to identify a partition for the record. The range of positive integers (e.g., 0 to $(2^{128})-1$) that can be produced by the hash function may represent a "key space" of the stream, and respective ranges of the key values may correspond to respective partitions. Consider an example scenario in which a stream S1 of data records which include a "username" attribute as the partitioning attribute has four partitions S1-P0, S1-P1, S1-P2 and S1-P3. If the integers between 0 and 999 (inclusive) are designated as the key space for 51, the key ranges for the four partitions may initially be set to 0-249 (for S1-P0), 250-499 (for S1-P1), 500-749 (for S1-P2) and 750-299 (for S1-P3). The "username" for a given record of the stream may be mapped, e.g., using a selected hash function or some other transformation function, to a number between 0 and 999, and the partition for the record may thereby be selected based on the particular key range in which the number lies. It is noted that using a key range comprising consecutive integers may be considered one specific implementation of a more general approach to partitioning, in which each partition has an associated key set, and not all the keys of a key set may be consecutive integers. Thus, in at least some embodiments, key sets comprising at least some non-consecutive integers may be designated for one or more partitions of a stream. To simplify the presentation, however, key ranges comprising consecutive integers are used for partitioning in much of the following description.

In practice, the key space of a stream may include a much larger number of key values than the 1000 values in the example above. In some embodiments, for example, the default key space may comprise $2^{128}$ integers (a 38-digit decimal number). In at least one embodiment, the SMS may not permit the use of non-default key spaces—that is, the key space for all streams may be identical, and may each be set to such a large range of integers. While such large key space sizes have obvious advantages with respect to the ability to distribute records of very large streams evenly among large numbers of partitions, dealing with key values that are such large integers may not be easy for at least some SMS customers. For example, some common spreadsheet tools or calculators may not be able to perform arithmetic on integers larger than 15 or 20 decimal digits.

Based on parameters indicated by a client in a request to create a stream (or on default partitioning policies of the SMS), in one embodiment an SMS control-plane component may determine how many partitions should be created initially for the stream. The number of nodes (e.g., processes or threads) that should be established for a given stream partition for ingestion, storage and retrieval, and how such nodes should be mapped to virtual and/or physical machines may also be determined by the SMS control-plane component. In at least some embodiments, the SMS may associate an explicit or implicit performance goal with each partition: e.g., enough resources or nodes may be provisioned or designated for each partition to support up to X ingestion or retrieval operations per second. Over time, the workload associated with a given stream or a given partition may increase or decrease, however, and as a result the initial partition set may no longer be well-suited to meeting the client's goals. In such situations, repartitioning of a stream may be desirable.

In at least some embodiments, an SMS may implement APIs to dynamically (i.e., without pausing the ingestion, storage or retrieval of the stream's data records) split a specified partition's key range into two, e.g., at a specified key boundary, and/or to merge two partitions with adjacent key ranges. However, determining the specific key values at which partitions should be split, and/or the sequence in which partitions should be split or merged, may be a non-trivial exercise for clients, especially in embodiments in which the key space is so large that arithmetic operations on the keys cannot be performed using everyday tools such as calculators or spreadsheets. Instead of dealing with the details of the split or merge parameters, clients may prefer to indicate higher-level goals to the SMS, such as the logical equivalent of "I would like stream S1 to be split into 10 partitions instead of 6" or "I would like to increase the number of partitions of stream S1 by 25%", and leave the details of the API calls to the SMS. In at least some embodiments, instead of specifying desired numbers of partitions or desired percentage changes in partition counts, clients may prefer the ability to request "auto-scaling" of a given stream. In implementations in which stream auto-scaling is supported, a client may indicate one or more optimization goals for a stream (e.g., indicating maximum acceptable response times for various types of stream operations), and request that the SMS is to re-partition the stream based on the goals, without requiring the client to specify target partition counts or relative amounts by which partition counts should be changed.

In various embodiments, one or more types of automated repartitioning agents (ARAs) may be established or supported by an SMS to simplify the process of repartitioning for clients. In at least one embodiment, an ARA may create a repartitioning plan for a particular stream established on behalf of client, and then issue a sequence of split and/or merge requests or commands to the appropriate set of SMS control-plane components to implement the plan efficiently. An ARA may be implemented in some embodiments as a tool that can be installed on client-owned computing devices (e.g., on a laptop, desktop, tablet or smart phone) located outside the provider network. In other embodiments ARAs may be established at resources within the provider network itself—e.g., at compute instances or virtual machines set up on behalf of the client, or as a component of the SMS control-plane.

The repartitioning plan may be determined by an ARA based on a variety of factors in different embodiments—e.g., based on relatively high-level repartitioning requests received from clients (such as "Increase the number of partitions of stream S1 by X %"), or based on auto-scaling settings, collected metrics on stream performance, and the like. A given repartitioning plan may include, for example, respective indications of (a) a source set of partitions of the stream (which may be all the existing partitions that are currently accepting new data records, or a subset of such existing partitions) whose keys are to be redistributed into a target set of partitions, (b) the target number of partitions of the target set, and/or (c) a target key range for each partition of the target set in some embodiments. In some embodiments, as described below in further details, a given stream partition may transition through one or more of several supported states (such as "open" or "closed") during its lifetime, and the source set may be selected from among those partitions of the stream that are in a particular state (e.g., the "open" state).

In at least some embodiments, in addition to the repartitioning plan, the ARA may generate or obtain a data structure representing the source set of partitions, with one data structure entry corresponding to each partition of the source set. For example, a stack representation of the source set may be generated in one embodiment, with the stack entries arranged in order of the starting key values of the corresponding partition key ranges. It is noted that although in much of the following description, a stack is indicated as the type of data structure that may be employed by the ARA for orchestrating repartitioning operations, other types of data structures may be used in other embodiments, such as linked lists, arrays, queues, or the like. In some implementations in which stacks are used, stack entries may be "pushed" or inserted into the stack in descending order of starting key values, so that after all the entries of the source set have been inserted, the top-of-stack entry corresponds to the partition with the lowest starting key (e.g., 0), and the entry at the bottom of the stack corresponds to the partition with the highest starting key among the source set. In other implementations, the entries may be pushed into the stack in ascending order of starting keys. In some embodiments in which data structures other than stacks are used, the data structure entries may also be arranged in an order based on the key ranges or key sets of the corresponding partitions. It is noted that in at least some embodiments, not all the target partitions may have the same number of keys, and the repartitioning plan may include a data structure in which the target key ranges are arranged in order of starting key values.

Using the stack (or alternative data structure) and the repartitioning plan's parameters, in various embodiments the ARA may implement an efficient iterative technique which ends in the redistribution of the source set's keys among the target set of partitions. In one embodiment, each iteration of the technique, which may be referred to herein as a redistribution iteration, may comprise removing ("popping") one entry off the stack, which may be referred to as the "top-of-stack" entry or "Etop", comparing the key range represented by the top-of-stack entry with the target key range of a selected partition of the target set, and taking one or more actions (which may be referred to as "redistribution actions" herein). The entry that was adjacent to the Etop entry in the stack (and therefore becomes the new entry at the top of the stack after Etop is removed) may be referred to as the "Enext" entry in the following description.

If Etop's key range is equal to (or lies within an acceptable tolerance level with respect to) the target key range, for example, the ARA may simply determine that the partition represented by Etop meets an acceptance criterion, and that the partition therefore does not need to be split or merged. The ARA may then proceed to the next repartitioning iteration, e.g., by popping the next entry from the stack, comparing its key range with the corresponding target partition's key range, and so on.

If the Etop's key range is smaller than the target key range, the ARA may examine the combined kay ranges of Etop and Enext. In embodiments in which the entries of the stack are arranged in key order, the combined key range would be expected to be contiguous. The combined key range would then be compared to the target key range. If the combined key range is smaller than or equal to the target key range, the ARA may submit a request to the SMS control-plane to merge the partitions represented by Etop and Enext. An entry corresponding to the merged partition (i.e., with the combined key range) may then be placed on the stack and the next repartitioning iteration would be begun. If the combined key range were larger than the target key range, the ARA may take a different set of redistribution actions in at least some embodiments. A request to split the partition represented by Enext (into two partitions X1 and X2) at a selected splitting key may first be sent to the SMS control plane, with the splitting key being selected such that the combination of the key ranges of Etop and X1 is equal to (or within acceptable tolerance levels of) the target key range. Then, a request to merge the partition represented by Etop with the X1 partition may be transmitted to the SMS control plane. Finally, a new entry representing X2 (the split partition that was not merged with Etop's partition) may be pushed onto the stack, and the next iteration may be begun.

If the key range of Etop is larger than the target key range, the ARA may transmit a request to the ARA control-plane to split the partition represented by Etop into two partitions Y1 and Y2, such that the key range of Y1 is equal to (or within an acceptable tolerance level with respect to) the target key range. A new stack entry corresponding to Y2 may then be pushed onto the stack, and the next repartitioning iteration may be begun. It is noted that at least in some embodiments, the "split partition" and "merge partition" operations refer to splitting and combining the key ranges of the partitions respectively, resulting in new partition mappings to be used for data records received in the future, and that the data records that have already been received and stored need not be moved or copied as a result of the splits or merges. In other embodiments, splits and/or merges may involve relocating or copying at least some previously received data records.

The repartitioning iterations may be performed in some embodiments until the stack is empty and the target configuration (e.g., the target number of partitions with the desired key ranges) has been created. In at least some embodiments in which a stack is used as the data structure, the total number of repartitioning iterations required to configure the target set of partitions using splits and/or merges as described above may be approximately of the order $O(2*abs(Tcount-Scount))$, where "abs( )" is the absolute value function, Tcount is the target number of partitions, and Scount is the number of partitions of the source set. The ARA may be able to systematically traverse the partitions of the source set in key order, perform the necessary key arithmetic computations, and issue the appropriate API calls to the SMS control-plane, with minimal or no interactions with the client in some embodiments. As indicated above, in at least some implementations at least some partitions of the target set need not match the target key ranges computed initially by the ARA exactly—e.g., the ARA may consider a key range that is within one percent (or some other tolerance level) of the target as acceptable, as long as each of the keys of the key space is mapped to a partition.

The key ranges of the target partitions need not be equal to one another in at least some embodiments. For example, one target partition may be created with a target key range of 10000 keys, while another may have a target key range of 20000 keys. In other embodiments the target key ranges for at least some streams may be selected in accordance with a workload balancing policy—e.g., the ARA may assign approximately (or exactly) the same number of keys to all the target partitions. In at least one embodiment, as mentioned earlier, an iterative repartitioning technique similar to that described above may be implemented at an SMS where the keys corresponding to a given stream partition need not be consecutive. In some embodiments, the ARA may use the iterative approach described above simply to rebalance the key space of a stream, e.g., instead of decreasing or increasing the number of partitions. In at least one embodiment, the source set of partitions may comprise a subset of the stream comprising one or more partitions identified as being "hot" or overloaded, or one or more partitions identified as being "cold" or underutilized. In at least one embodiment, the repartitioning technique may be used at one or more storage services that are not necessarily implemented for stream management—e.g., at a relational or non-relational database service, at an object storage service which enables clients to store unstructured data objects of arbitrary size and access them via web services interfaces, or at a storage that implements block-device programmatic interfaces.

Example System Environment

FIG. 1 illustrates an example system environment in which automated repartitioning of streams may be supported by a stream management service of a provider network, according to at least some embodiments. As shown, system 100 comprises a provider network 105 at which a number of network-accessible services may be implemented, such as a stream management service (SMS) 107, a virtualized computing service 192 and one or more storage services 190 that are used primarily for non-streaming data. Using programmatic interfaces implemented by SMS 107, clients may request the creation of numerous streams 140 (e.g., 140A or 140B), and SMS control-plane components 151 may assign the appropriate set of resources to ingest data records received from various data producers (DPs) 160, store the data records, and respond to retrieval requests for data records from data consumers (DCs) 165. Some data producers including DP 160T (such as log records generators of various applications being run within the provider network) may be present within the provider network 105, while other data producers including DP 160A, 160B, 160K and 160L (such as sensor devices, cell phones, applications running on client premises and the like) may be located outside the provider network. Respective sets of programmatic interfaces may be implemented by the SMS for data record ingestion, retrieval and control/administrative operations in various embodiments, as described below in further detail. In the depicted scenario, DPs 160A and 160B may submit data records for insertion into stream 140A via the ingestion interfaces, as indicated by arrows 130A and 130B. Data consumers 165A, 165B and 165C may use the retrieval records to read the data records of stream 140A, as indicated by arrows 131A, 131B and 131C. Similarly, as indicated by arrows 130C, 130D and 130E, data produces 160K, 160L and 160T may submit data records for insertion into stream 140B, while data consumers 165C and 165D may retrieve contents of stream 140B as indicated by arrows 130E and 130F. A given data producer may transmit data records to one or more streams, and a given data consumer may retrieve data from one or more streams in the depicted embodiment.

In at least some embodiments, respective sets of software and/or hardware resources (e.g., processes/threads and associated computing, storage and networking hardware) may be designated for ingestion, storage and retrieval subsystems of the SMS as discussed below in the context of FIG. 2. In one embodiment, the provider network 105 may comprise numerous data centers, and the resources assigned to a given stream may be organized into redundancy groups that span multiple data centers, so that the receiving, storing and retrieving of the stream's data records can continue even in the event of failures at a given data center.

In the depicted embodiment, the data records of a given stream such as 140A or 140B may be distributed among one or more partitions (which may also be referred to as "shards") based on respective key values corresponding to the data records. Each stream 140 may have a corresponding stream key space (SKS) 142, such as SKS 142A of stream 140A and SKS 142B of stream 140B. In some embodiments, a stream key space may comprise a range of integers to which the values of selected attributes of the data records may be mapped, e.g., using some set of hash functions or other mathematical functions, to determine the partitions in which the data records are to be placed. In one embodiment, a range of key values may be assigned to each partition. For example, in FIG. 1, stream 140A is divided into four partitions, and its key space 142A is accordingly divided into four contiguous key ranges P0-KR, P1-KR, P2-KR, and P3-KR. In the depicted embodiment, the number of distinct keys in the key range for a given partition of a stream 140 may differ from the number of distinct keys in the key range for a different partition of the same stream. In at least some embodiments, when a stream is set up, either the SMS or the client may select an initial number of partitions and the key space boundaries, and divide the key space into equal-sized (or approximately equal-sized) ranges for the different partitions. The stream key space may be divided into uniformly-sized ranges, for example, under the assumptions that (a) the data records of the stream will be mapped fairly uniformly across the key space by the hash functions or other mapping functions being used (b) the workload (e.g., for receiving, storing, and providing access to) a given partition is proportional to the number of records that are mapped to the partition, and (c) the computing, networking and storage resources associated with a given partition are at least roughly equivalent in performance capabilities to the corresponding resources of any other partition. In some embodiments, several different (or all) of the streams 140 may have the same key space 142—e.g., integers between 0 and $(2^{128})-1$ may be used as the key space for several or all the streams. In other embodiments, different key spaces may be used respective streams—e.g., SKS 142B of stream 140B may be set to (0 through $(2^{128})-1$), while SKS 142A of stream 140A may be set to $(2^{192})-1$). In various embodiments, at least some of the key spaces may be set to very large ranges of integers, e.g., in anticipation of a potential need to map very large numbers of data records to very large numbers of partitions.

Over time, the initial set of one or more partitions established for a given stream may be found to be inadequate. For example, in some embodiments the SMS may provision enough resources for a given partition to be able to handle a specified write (e.g., data record ingestion) and/or read (e.g., data record retrieval) throughput. When and if the workload of the stream exceeds the workload for which its initial partition set was provisioned, a change to the partition set may be advisable. In at least some embodiments, clients of the SMS may be able to request a split of a particular partition's key range based on a specified splitting key, or a merge of the keys of two partitions with adjacent key ranges (e.g., P0-KR and P1-KR of stream 140B). Such partitioning changes may be implemented dynamically in at least some embodiments as described below in further detail, e.g., without requiring that the affected stream (or any subset of its partitions) be taken offline, and without pausing the acquisition, storage or consumption of the stream's data records. In at least some implementations, when a partition is split, it may be replaced by two new partitions (with respective new partition identifiers and new sets of assigned resources). The original partition that was split may eventually be marked as "closed" or "terminated", indicating that new data records are not to be added to it. The new partitions (as well as any of the other partitions that have not been split or merged) may be designated as "open" or "active", and may be used for new incoming data records. In some embodiments, the SMS may internally maintain a directed acyclic graph (DAG) or tree representation of the partitions of a given stream, e.g., with new "open" nodes being added when splits occur, and existing nodes being marked "closed" when records are no longer allowed to be added to the corresponding partitions as a result of a split or a merge.

One or more automated repartitioning agents (ARAs) 180, such as 180A, 180B or 180C may be implemented in various embodiments to simplify (from the client's perspective) the process of repartitioning streams, especially in scenarios when multiple splits or merges may be required to achieve a desired objective. Some ARAs, such as 180A, may be installable on client-owned computing devices such as host 149 located in a client network 188 outside the provider network. Other ARAs, such as 180C, may be implemented at virtualization hosts 144 of a virtual computing service 192 implemented at the provider network, and may be invoked, for example, from guest virtual machines or compute instances set up for a client. In at least some embodiments, ARAs such as 180B may be included within the control-plane of the SMS 107, e.g., to implement auto-scaling policies of the SMS and/or to respond to invocations of control-plane APIs by the clients. In accordance with an auto-scaling policy, for example, the ARA may monitor performance metrics collected by measurement agents for various streams or partitions, and initiate partition splits and/or merges based on the metrics and optimization goals, without requiring specific client interactions to trigger such operations.

In at least one embodiment, an ARA 180 may determine a repartitioning plan for a particular stream 140, e.g., either in response to a client request or based on auto-scaling policies or various triggering conditions. The plan may, for example, identify a source set of partitions of the stream 140 whose keys (and hence, data records with those keys that are received in the future) are to be distributed among a target set comprising a selected number of partitions, and the respective target key ranges for each of the target set's partitions. Thus, in one example scenario, a client may submit a request indicating that the number of active partitions of a stream such as 140A is to be increased from four to six (or, alternatively, that the number of partitions is to be increased by 50%) with an equal number of keys in each of the target key ranges. In this scenario, all the active partitions of the stream 140A would form the source set, the target number of partitions would be six, and the key space 142A may be divided into six equal (or as nearly equal as integer arithmetic allows) target key ranges. In other example scenarios, the client may specify, or the ARA may select, less than all of the stream's current set of active partitions as the source set, e.g., based on the level of imbalance among the existing partitions or based on performance measures associated with individual partitions. In at least some embodiments, e.g., based on the client's preferences and/or on the ARS's workload analysis, the keys of the source set may not necessarily be divided uniformly across the target partition set.

The ARA 180 that generates the repartitioning plan may obtain or generate a stack representation of the source set of partitions in the depicted embodiment, with respective stack entries for each of the partitions of the source set. The entries may be pushed onto the stack in key order—e.g., in descending order of the starting key of the corresponding partitions. The ARA 180 may then perform one or more repartitioning iterations using the stack and the repartitioning plan parameters. In each iteration, as described below in further detail in the contexts of FIG. 6, FIG. 9a and FIG. 9b, the ARA may pop the stack, compare the key range of the popped entry with a corresponding target key range, and take one or more actions based at least in part on the result of the comparison. In some cases, e.g., when the entry removed from the stack has a larger key range than the target key range, the ARA may submit a programmatic request to the SMS control-plane to split the corresponding partition such that a target partition with an acceptable key range is created, and push a new entry onto the stack corresponding to the remainder of the split partition. Programmatic interactions between the ARAs 180 and the control-plane components 151 of the SMS are indicated by arrows 132 in FIG. 1, e.g., 132A and 132B.

If the entry removed from the stack has a smaller key range than the target, the key range of the adjacent entry (the one now at the top of the stack) may also be taken into consideration in combination with the key range of the popped entry. Depending on whether the combined key range exceeds the target key range or not, the repartitioning actions taken may include a split of followed by a merge, or just a merge, and a new entry may be pushed onto the stack. If the key range of the popped entry is either equal to, or close to (e.g., within a tolerance level selected by the ARA) the target key range, no splits or merges may be required, and the ARA may start its next repartitioning iteration by popping the next entry from the stack. The iterations may continue until the stack is empty and/or the desired set of target partitions has been created. In at least some embodiments, the merge and/or splits may be performed while the stream remains online, so that the ingestion storage and retrieval of data records continues is not paused or disrupted. With the help of the ARAs, various performance and/or budgeting-related goals of the SMS clients may be achieved without requiring the clients to deal with such low-level details as determining the appropriate keys to be used to split a partition, or determining the sequence in which splits and/or merges should be performed.

In some embodiments, an ARA 180 may be used to increase the number of active partitions of a stream (which may for example be appropriate in view of an increase in the workload), decrease the number of active partitions (which may for example be appropriate when the workload of a stream decreases), and/or rebalance the distribution of the key space without changing the number of active partitions. Each partition of a given stream may have some number of resources, which may be termed SMS "nodes", assigned to it in some embodiments. At least in some embodiments, the amount that SMS clients may have to pay for their streams may be based at least in part on the resources used, and therefore at least in part on the partitions that have been set up. Thus, the use of ARAs may help clients achieve not only better overall performance for stream operations (e.g., by improving workload distribution), but also lower overall costs in at least some embodiments. In at least one embodiment, ARAs may be used for repartitioning storage objects at other non-streaming storage services 190, e.g., instead of or in addition to being used for streams 140.

SMS Subcomponents

Figure 2:
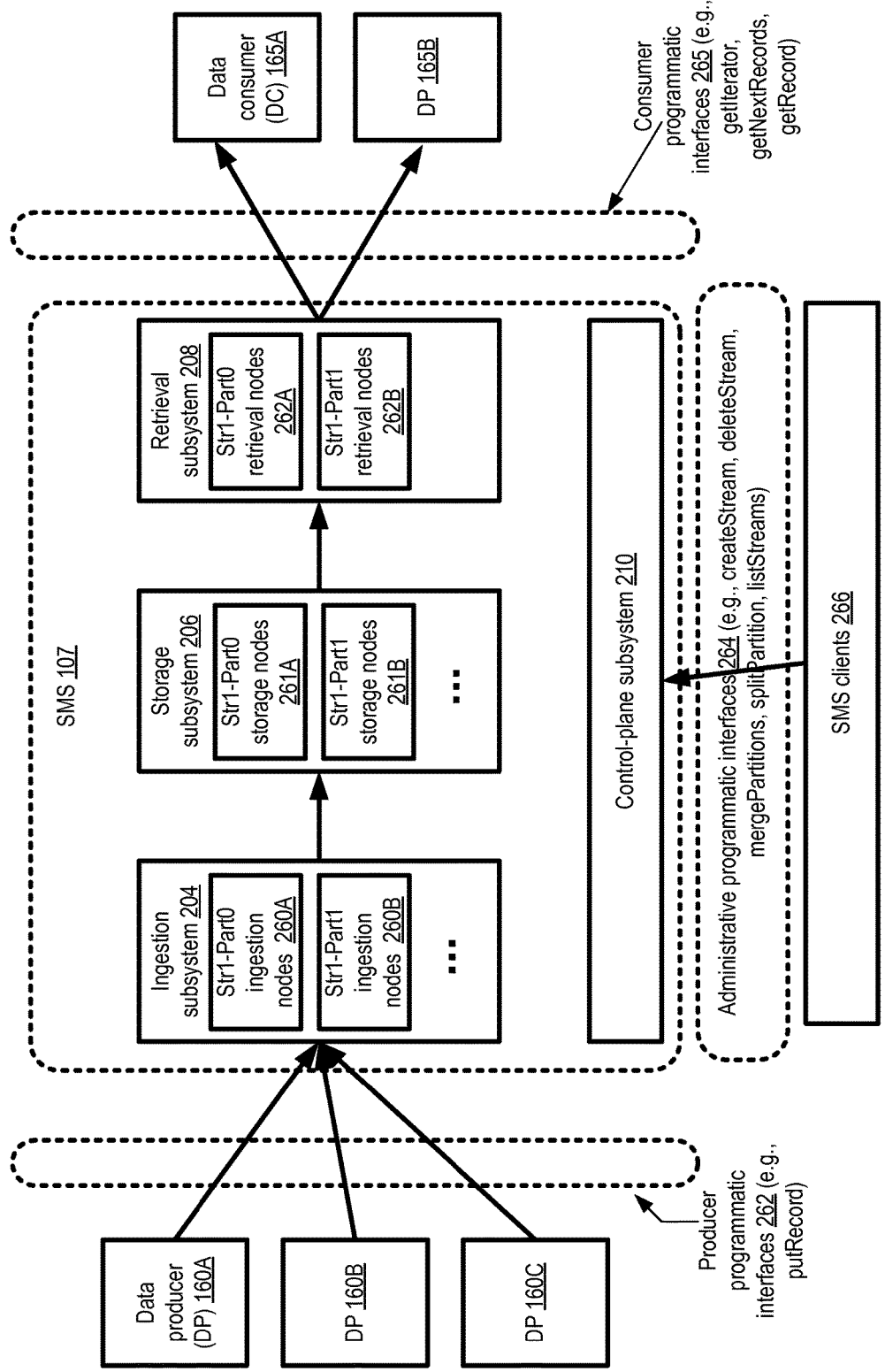
FIG. 2 illustrates example subsystems of a stream management service, according to at least some embodiments.

FIG. 2 illustrates example subsystems of a stream management service, according to at least some embodiments. As shown, the SMS 107 may comprise an ingestion subsystem 204, a storage subsystem 206, a retrieval subsystem 208, and a control-plane subsystem 210. Each of the SMS subsystems may include one or more nodes or components, implemented for example using respective executable threads or processes instantiated at various servers or hosts of a provider network. Nodes of the ingestion subsystem 204 may be configured (e.g., by nodes of the control subsystem 210) to obtain or receive data records of a particular data stream from data producers 160 (such as 160A, 160B, and 160C), and each ingestion node may pass received data records on to corresponding nodes of the storage subsystem 206. The storage subsystem nodes may save the data records on any of various types of storage devices (e.g., solid-state drives (SSDs), rotating magnetic disk-based devices, or volatile memory devices) in accordance with a persistence policy selected for the stream. Nodes of the retrieval subsystem 208 may respond to read requests from data consumers such as 165A or 165B. In the depicted embodiments, respective sets of one or more nodes may be designated for each partition of a stream at the ingestion subsystem, the storage subsystem and the retrieval subsystem. For example, ingestion nodes 260A may be set up for partition 0 of stream 1 ("Str1-Part0"), ingestion nodes 260B may be set up for partition 1 of stream 1 ("Str1-Part1"), and so on. Similarly, one or more storage subsystem nodes 261A may be set up for Str1-Part0, storage subsystem nodes 261B may be designated for Str1-Part1, and so on. Respective sets of retrieval nodes 262A and 262B may be set up for Str1-Part0 and Str1-Part1 as well. Similar sets of resources at each subsystem may be established for other streams and other partitions of the stream.

In the embodiment depicted in FIG. 2, SMS clients 266 may utilize one or more sets of administrative programmatic interfaces 264 to interact with the control-plane subsystem 210. Similarly, data producers 160 may use producer programmatic interfaces 262 to submit data records, and data consumers may use consumer programmatic interfaces 265 to read the stored records. At least some of the ARAs 180 illustrated in FIG. 1 may also act as clients of the control-plane subsystem 210 in various embodiments. A few specific examples of APIs (application programming interfaces) that may be used for submitting stream data records, retrieving stored stream data records and/or requesting administrative operations in various embodiments are also shown in FIG. 2. For example, data producers 160 may use a "putRecord" API to submit a data record into a specified stream (or a specified partition of a specified stream). In at least some embodiments, a sequencing indicator (such as a sequence number) may be associated with each data record that is stored by the SMS, and the records of a given stream may be retrievable either in sequence number order or in random order. A "getIterator" API may be used by a data consumer to indicate a starting position or starting sequence number within a stream or partition in the depicted embodiment, and a "getNextRecords" API may be used to retrieve records in sequential order from the iterator's current position. A "getRecord" API may also be supported in the depicted embodiment, e.g., for random accesses that do not require iterators to be established. Control-plane or administrative APIs may include, for example, "createStream" (to establish a new stream), "deleteStream" (to remove an existing stream), "listStreams" (to obtain a collection of streams that the requester is authorized to view), "mergePartitions" to combine key ranges of two specified partitions, and "split-Partition" to create key ranges for two new partitions from an existing partition using a specified splitting key. It is noted that programmatic interfaces other than APIs (e.g., web pages such as web-based consoles, graphical user interfaces and/or command-line tools) may be used in at least some embodiments.

In some embodiments, the various subsystems of an SMS shown in FIG. 2 may be configured to support desired levels of availability and/or data durability, e.g., using various failover and replication policies. In one embodiment, a provider network at which an SMS 107 is implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, or (in the case of some SMSs) distributing the nodes of a given SMS across multiple availability containers.

In one embodiment, redundant groups of nodes may be configured for one or more of the subsystems of an SMS. That is, instead of for example configuring one retrieval node for retrieving data records for a stream partition Sj-Pk (the "k"th partition of stream "j"), two or more nodes may be established for such retrievals, with one node being granted a "primary" or active role at a given point in time, while the other node or nodes are designated as "non-primary" nodes. The current primary node may be responsible for responding to work requests, e.g., requests received either from clients or from nodes of other subsystems. The non-primary node or nodes may remain dormant until a failover is triggered, e.g., due to a failure, loss of connectivity to the primary, or other triggering conditions, at which point a selected non-primary may be notified by a control node to take over the responsibilities of the previous primary. The primary role may thus be revoked from the current incumbent primary node during failover, and granted to a current non-primary node. In some embodiments, non-primary nodes may themselves take over as primary when a determination is made that a failover is to occur, e.g., explicit notifications may not be required. Respective redundant groups of nodes may be set up for ingestion, storage, retrieval and/or control functions at an SMS in various embodiments. Such groups comprising at least one primary node and at least one non-primary node for a given function may be referred to as "redundancy groups" or "replication groups" herein. It is noted that redundancy groups of storage nodes may be implemented independently of the number of physical copies of the data records that are stored—e.g., the number of replicas to be stored of a data record may be determined by a persistence policy, while the number of storage nodes that are configured for the corresponding partition may be determined based on redundancy group policies.

Figure 3:
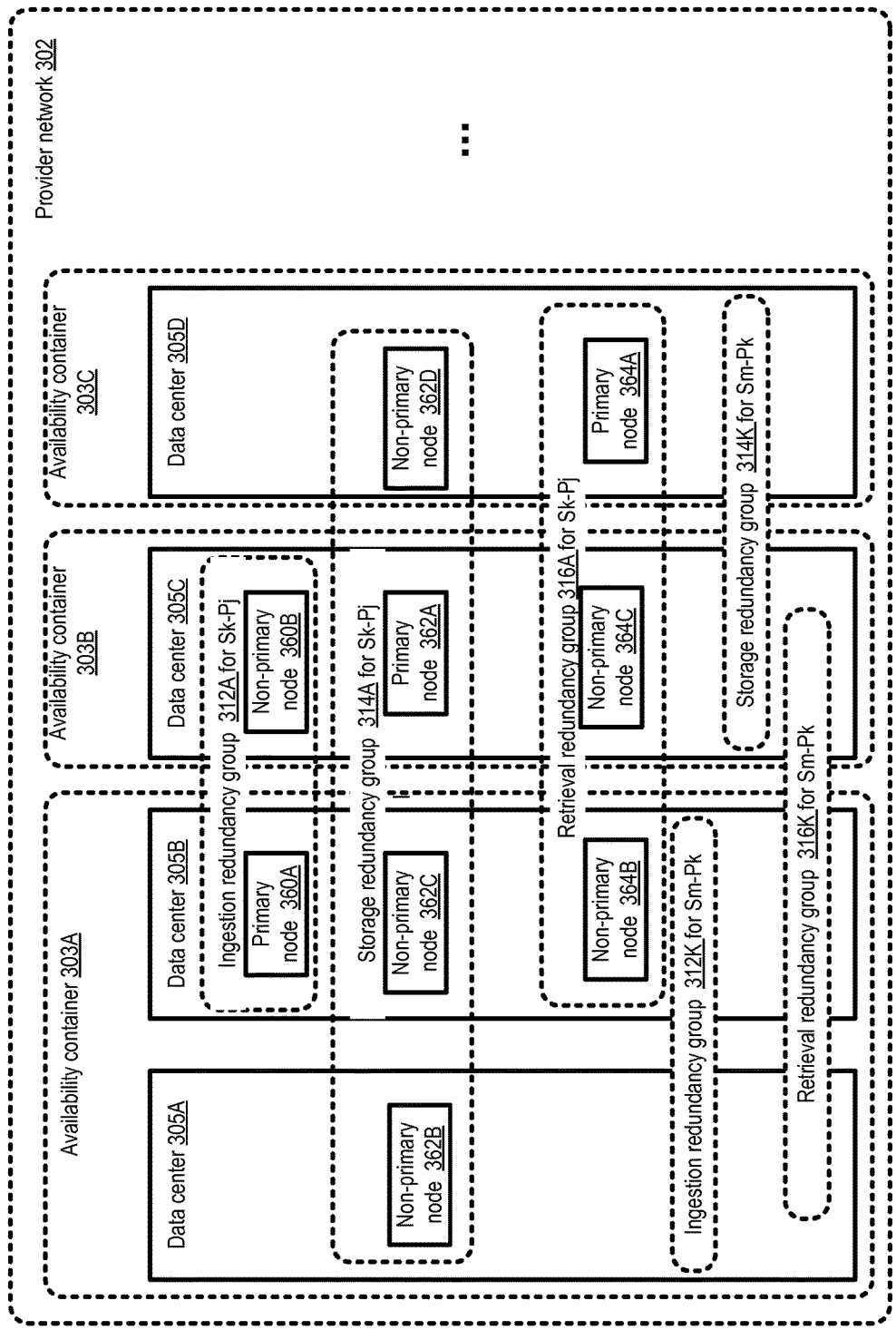
FIG. 3 illustrates an example stream management service at which respective redundancy groups of ingestion, storage and retrieval nodes may be configured for one or more partitions of a stream, according to at least some embodiments.

FIG. 3 illustrates an example stream management service at which respective redundancy groups of ingestion, storage and retrieval nodes may be configured for one or more partitions of a stream, according to at least some embodiments. In the depicted embodiment, provider network 302 comprises three availability containers 303A, 303B and 303C. Each availability container includes portions or all of one or more data centers—e.g., availability container 303A comprises data centers 305A and 305B, availability container 303B includes data center 305C, and availability container 303C includes data center 305D. A number of different redundancy groups corresponding to various stream partitions and SMS subsystems are shown. For example, ingestion redundancy group 312A is set up for partition Sk-Pj, and includes primary node 360A in data center 305B of availability container 303A and non-primary node 360B in data center 305C of availability container 303B. Storage redundancy group 314A for the same partition Sk-Pj may include primary node 362A at data center 303B and non-primary nodes 362B, 362C and 362D at data centers 305A, 305B and 305D respectively. Retrieval redundancy group 316A for partition Sk-Pj may include primary node 364A at data center 305D, and non-primary nodes 364B and 364C at data centers 305B and 305C. In general, the nodes of a given redundancy group may be distributed across multiple data centers and/or multiple availability containers, e.g., to increase the probability that at least one node of the group survives in the event of a large-scale outage. Other redundancy groups may be set up for other partitions and distributed across data centers in various ways, such as ingestion redundancy group 312K, storage redundancy group 314K or retrieval redundancy group 316K, all of which may be set up for a partition Sm-Pk of a different stream Sm. (to avoid clutter, individual nodes of Sm-Pk redundancy groups are not shown in FIG. 3.) As indicated in FIG. 3, numerous resources may be deployed for a given stream partition across different data centers in at least some embodiments. The consequences of partitioning a stream in a less-than-optimal manner may therefore be quite significant, and the use of ARAs may help clients to avoid sub-optimal configurations that may otherwise result in the imbalanced use or wastage of resources.

Examples of Stream Partitioning Changes Over Time

Figure 4A:
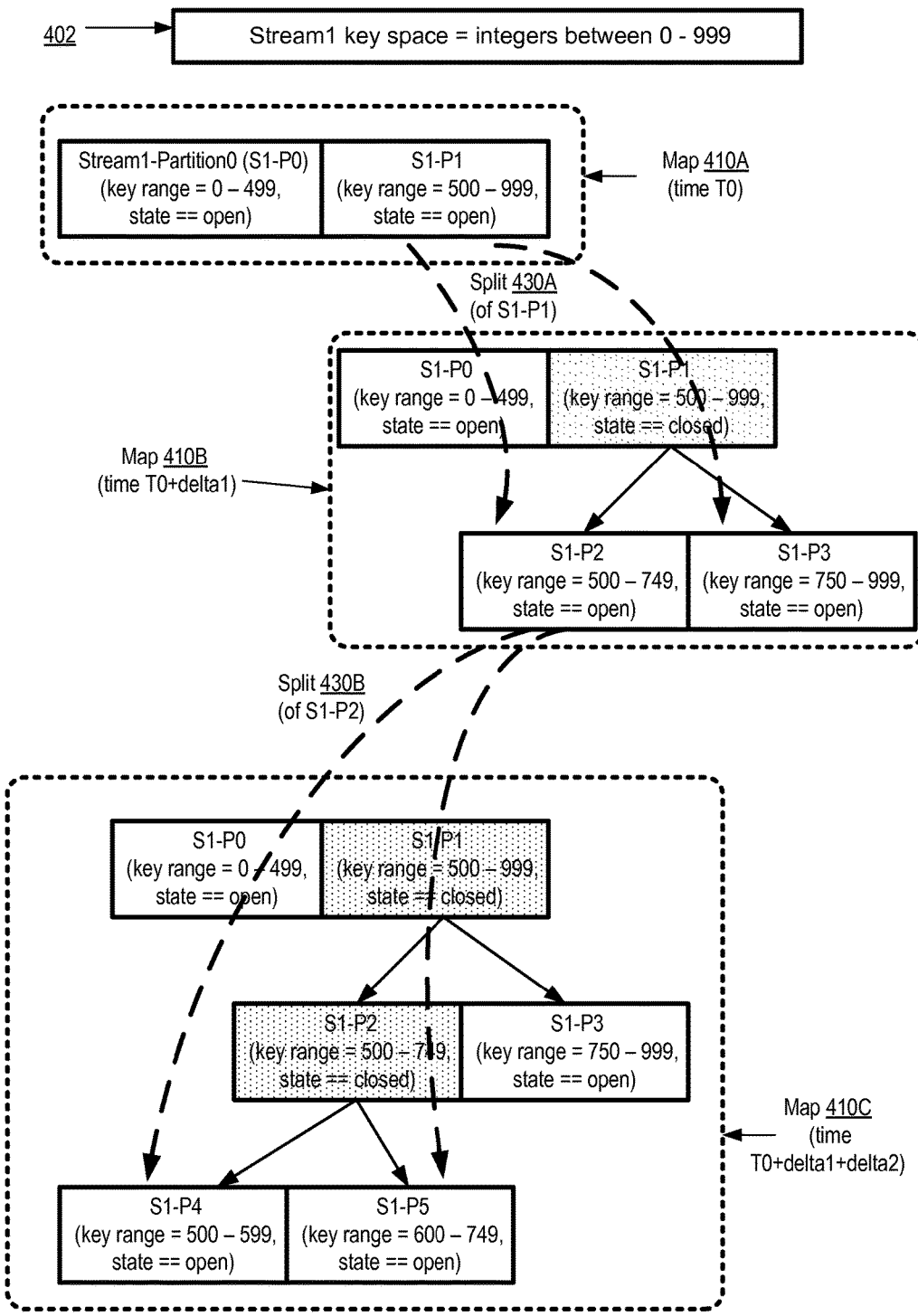
FIGS. 4a and 4b collectively illustrate an example sequence of changes to a stream's partition map resulting from client-requested splits and merges, according to at least some embodiments.
Figure 4B:
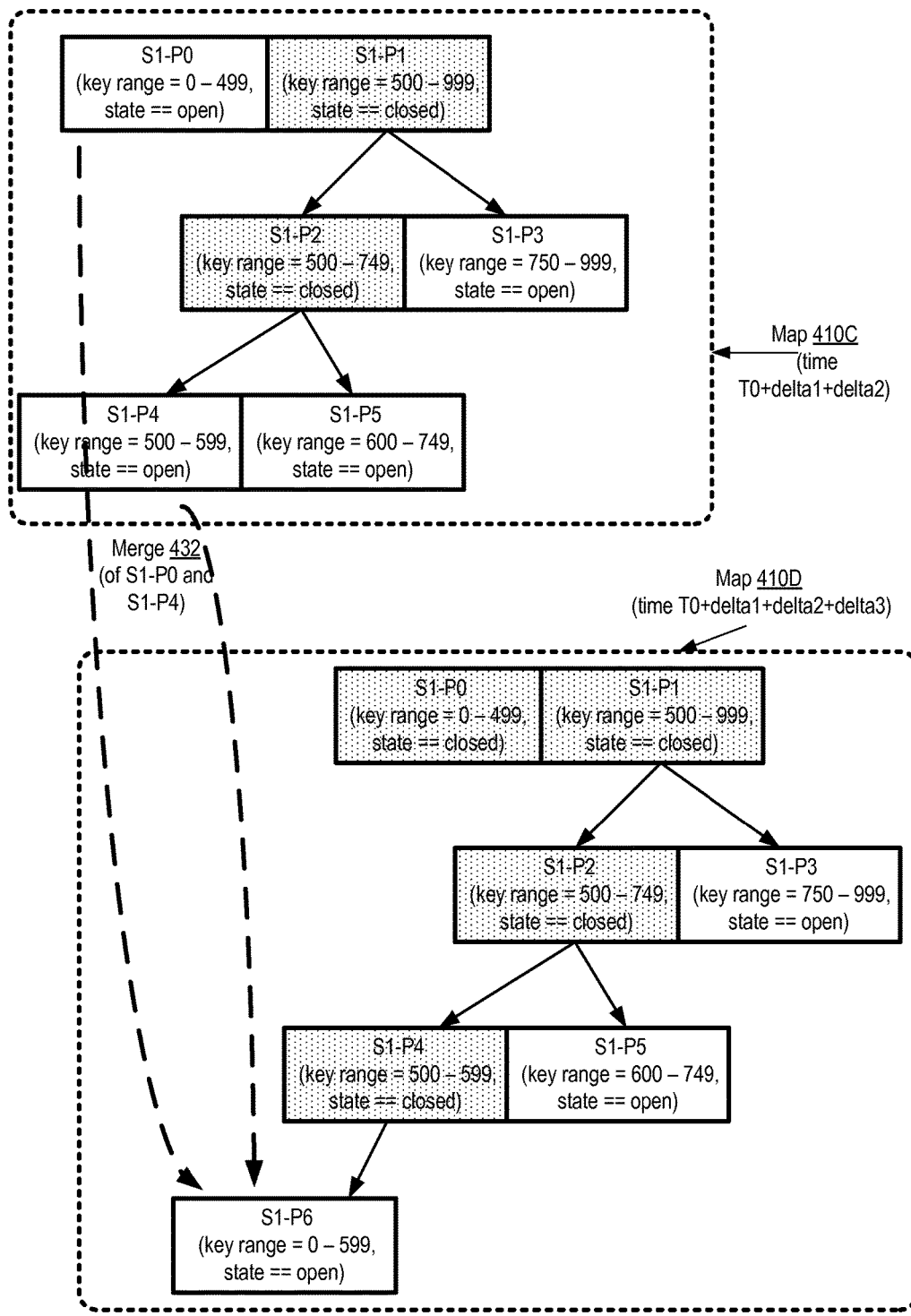

As mentioned earlier, in some embodiments an SMS may enable clients to request merges or splits of stream partitions. A history of the changes that have been applied to a given stream's partition boundaries over time may be represented by a partition map in some embodiments. FIGS. 4a and 4b collectively illustrate an example sequence of changes to a stream's partition map resulting from client-requested splits and merges, according to at least some embodiments. In at least some embodiments, a DAG, a TreeMap, or a similar data structure may be used within an SMS control-plane to store a partition map. In the embodiment depicted in FIGS. 4a and 4b, each partition is shown either in an "open" state or a "closed" state. A partition that is "open" may continue to receive data records corresponding to its key range from data producers in the depicted embodiment, while a partition that is "closed" may not receive new data records. As discussed below with reference to FIG. 5, in various embodiments at least some record retrieval operations may continue to be directed to a partition for some time after the partition is closed.

To simplify the presentation, a small stream key space 402 comprising the 1000 integers between 0 and 999 inclusive has been selected for a stream called "Stream1" in FIGS. 4a and 4b. Initially (e.g., when Stream1 is created at a time T0), two partitions S1-P0 and S1-P1 are set up for Stream1. S1-P0 has a key range 0-499, and S1-P1 has a key range 500-999, and both the partitions are open, as indicated in map 410A of Stream1. At some point after Stream1 is created, e.g., at time (T0+delta1), a split 430A of S1-P1 is initiated, and as a result two new partitions S1-P2 and S1-P3 that may be considered "children" of S1-P1 may be added to the partition map. In the resulting map 410B, S1-P1's key range has been split into range 500-749 (for S1-P2), and 750-999 (for S1-P3). Subsequent to the split 430A, the state of S1-P1 may be set to closed (as indicated by the shading of the box representing S1-P1), while the two children partitions are in the open state. Similarly, if split 430B of S1-P2 is later implemented at time (T0+delta1+delta2), two new partitions S1-P4 and S1-P5 may be added to map 410B to form map 410C. S1-P4's key range may be set to 500-599 in the depicted example, and S1-P5's key range may be set to 600-750—that is, the number of keys assigned to each child partition resulting from a split need not necessarily be equal (or even close to equal). S1-P2 may be closed, while its children partitions remain open.

As shown in FIG. 4b, at a later time (T0+delta1+delta2+delta3), a merge 432 of partitions S1-P0 and S1-P4 may be initiated. S1-P0 and S1-P4 may be eligible for a merge in the depicted embodiment because the highest key in S1-P0's key range (499) is one less than the lowest key assigned to S1-P4 (500), thus making the two key ranges contiguous. In the resulting map 410D, a new open partition S1-P6 with the combined key range 0-599 may be added, while partitions S1-P0 and S1-P4 may eventually be closed. Each of the four partition maps 410A, 410B, 410C and 410D may be considered representative of respective states of a finite state machine corresponding to a portion of the lifecycle of Stream1, with the splits 430A and 430B and merge 432 representing discrete transitions between Stream1 states. As indicated in FIGS. 4a and 4b, the partition map of a given stream (especially a stream with dozens or hundreds of partitions) may get fairly complex after some number of merges and splits. Consequently, it may not be straightforward for a customer of the SMS to understand the current partition map of a stream, to identify which keys should be used to split partitions to achieve a desired high-level objective such as better workload distribution across partitions, or to identify which partitions should be merged to achieve a desired high-level objective.

Figure 5:
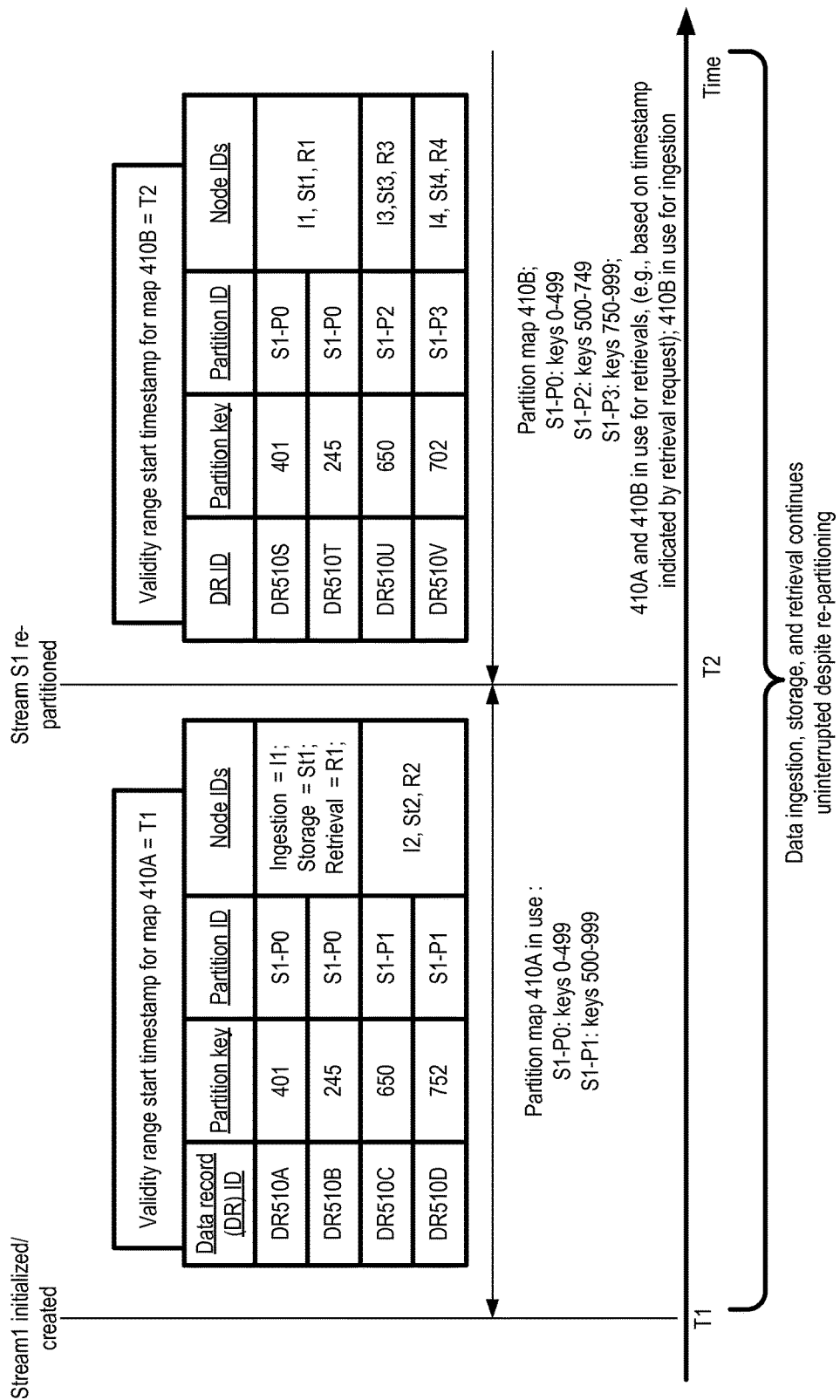
FIG. 5 illustrates an example of dynamic stream repartitioning, according to at least some embodiments.

FIG. 5 illustrates an example of dynamic stream repartitioning, according to at least some embodiments. In embodiments in which dynamic repartitioning is supported, as mentioned earlier, the ingestion, storage and retrieval of data records may continue uninterrupted despite the occurrences of merges or splits. At time T1 of the timeline illustrated in FIG. 5, stream "Stream1" with a key space 402 (i.e., integers between 0 and 999) of FIG. 4a is created or initialized. Partition map 410A comprising P1-S0 and P1-S1 (shown in FIG. 4a) is created for Stream1, and remains in effect during the time interval T1 through T2. Four data records (DR510A-DR510D) received by an SMS between T1 and T2 are shown by way of example, with respective key values 401, 245, 650 and 752. Accordingly, DR510A and DR510B are mapped to partition S1-P0 (whose key range is 0-499), while DR510C and DR510D are mapped to partition S1-P1 (whose key range is 500-999). A respective ingestion, storage and retrieval node is designated for each of the partitions: nodes I1 and I2 for ingestion of records of P1-S0 and P1-S1 respectively, nodes St1 and St2 for storage, and nodes R1 and R2 for retrieval.

At time T2, Stream1 is dynamically repartitioned in the example timeline of FIG. 5, e.g., as a result of the split 430A shown in FIG. 4a. Data records continue to arrive and be handled by the SMS in the depicted embodiment, irrespective of when the repartitioning occurs; the SMS is not taken offline, and the processing of data records may not be paused. In the depicted embodiment, the new mapping 410B takes effect at time T2 (or shortly after T2), as indicated by the validity range start timestamp setting shown for 410B. As a result of the split 430A, two new partitions S1-P2 and S1-P3 were included in map 410B with respective key ranges 500-749 and 750-999 as shown in FIG. 4a. New nodes I3, St3 and R3 have been designated for ingestion, storage and processing for S1-P2, and new nodes I4, St4 and R4 have been designated for ingestion, storage and processing for S1-P3. It is noted that in at least some embodiments, some of the pre-existing nodes may be re-used after the repartitioning—e.g., not all the processes or threads that were being used as ingestion, storage or retrieval nodes for the now-closed partition need be terminated.

The disposition of four additional data records received after the split (DR510S, DR510T, DR510U and DR510V) is shown in FIG. 5. DR 510S with key 401 is placed in partition S1-P0, as is DR510T with key 245. DR510U has a key value of 650, and is placed in partition S1-P3 (whereas, had it arrived between T1 and T2, DR510U would have been placed in S1-P1). Record DR510V with key 702 is now placed in partition S1-P4. Thus, in the depicted embodiment, none of the example data records shown as being received after T2 are designated as members of the previously-open partition S1-P1; instead, completely new partitions (and new nodes for ingestion, storage and retrieval) are used after the repartitioning. In some embodiments, at least some previously used partitions may continue to be used after repartitioning.

During at least some time period after the dynamic repartitioning at T2, retrieval requests may continue to be retrieved for data records that were processed by the SMS ingestion and/or storage subsystems prior to the repartitioning. In at least some cases, the requested data records may have to be retrieved based on the 410A map which was in effect at the time that the data records were ingested. Accordingly, as indicated in FIG. 5, for the purposes of data retrieval, both maps 410A and 410B may continue to be used for some (typically short) time after T2. In at least some embodiments, metadata stored for the map 410A, e.g., by the SMS control-plane subsystem, may indicate that it has been superseded by map 410B but is still in use for retrievals. Such metadata may be used by the ARAs to avoid performing repartitioning on obsolete partition maps in some embodiments. In at least some implementations, data records may eventually be deleted from the stream as they age, and the older partition maps may also be discarded eventually, e.g., when all the corresponding data records have themselves been deleted.

Iterative Repartitioning Technique

Figure 6:
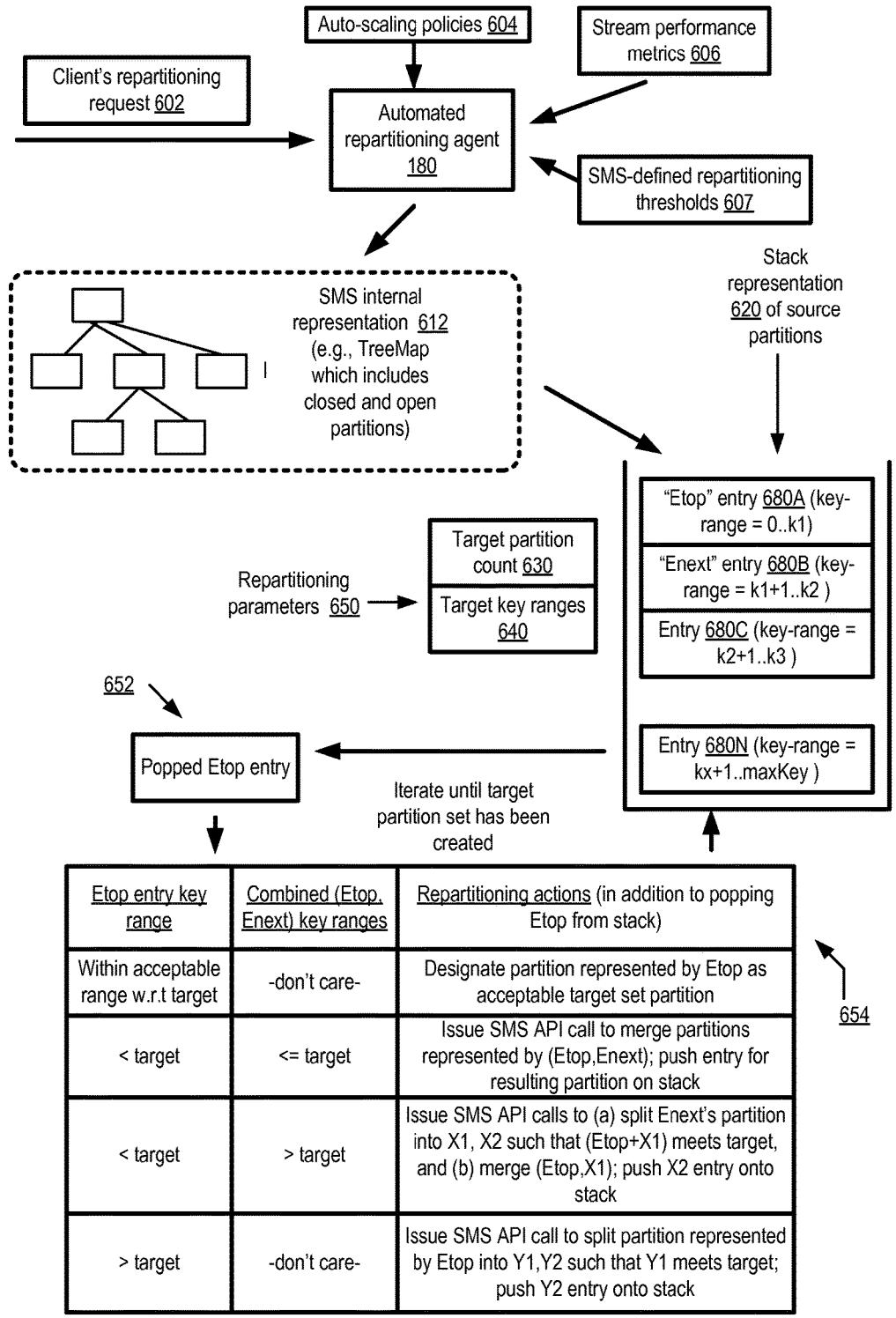
FIG. 6 illustrates an example iterative technique that may be used to automate repartitioning of a stream using a stack-based representation of the stream's active partitions, according to at least some embodiments.

FIG. 6 illustrates an example iterative technique that may be used to automate repartitioning of a stream using a stack-based representation of the stream's active partitions, according to at least some embodiments. An ARA 180 may initiate the iterative technique based on any combination of several factors in the depicted embodiment. In some cases, for example, a repartitioning request 602 of a client may be received or detected by the ARA 180, e.g., as a result of the invocation by the client of an SMS control-plane API or as a result of an interaction of the client with a standalone ARA tool or utility installed at a client computing device. At least in some embodiments, the client's request 602 may indicate a high-level objective to be achieved via repartitioning, such as the logical equivalent of "increase the number of partitions of stream S1 by 33%" or "increase the number of partitions of stream S1 such that it can handle N1 putRecord operations per second and N2 getRecord operations per second". When providing such high-level guidance, the client may not specify details such as the key values at which a particular partition is to be split, or how many splits/merges need to be performed; instead, such details may be left to the ARA.

In some embodiments, one or more streams may have auto-scaling policies 604 associated with them, and the rules or parameters of the auto-scaling policies may trigger the ARA to perform repartitioning. For example, a client may specify a set of performance goals that are to be met by a stream S1 as part of S1's auto-scaling policy, such as an average or 90th percentile response time for putRecord operations or getRecord operations, or a target throughput for reads or writes to be sustained per S1 partition. The SMS may be responsible for making the necessary partitioning changes and/or resource allocation adjustments to comply with the auto-scaling policy 604. Performance metrics 606 gathered by various metrics collectors of the SMS for S1 and/or other streams may trigger the ARA to initiate the repartitioning technique described below in view of the auto-scaling policies 604. In some embodiments, performance metrics may be available for specific partitions instead of, or in addition to, stream-level metrics. In at least one embodiment, a client may examine performance metrics 606 (e.g., either at the stream level or at a per-partition level) and submit a repartitioning request 602 based at least in part on an analysis of the metrics. In some embodiments, the ARA 180 may initiate repartitioning for a given stream if one or more SMS-defined threshold conditions 607 have been met (such as the condition that a particular partition's key range encompasses more than X % of the keys of the key space while another partition's key range encompasses less than Y % of the key space), even if the client does not issue a repartitioning request and even if there are no auto-scaling requirements associated with the stream.

In response to a determination that repartitioning is to be performed, the ARA 180 may generate a repartitioning plan for the stream in the depicted embodiment. As part of the process of generating the plan, the ARA may identify a source set of partitions of the stream whose records are to be redistributed, a target partition count 630, and the target key ranges 640 corresponding to each partition of the target set of partitions. In addition, the ARA may obtain or create a data structure with respective entries for each of the source set partitions, such as stack representation 620 of FIG. 6. In order to obtain the stack 620, in some embodiments the ARA may issue one or more API calls to the SMS control-plane to determine the current map of the stream. The SMS may store partition maps internally in various formats, such as for example directed acyclic graphs (DAGs) or TreeMaps. The internal representation of the stream 612 may include entries for both open and closed partitions in some embodiments. The ARA 180 may extract the open partitions from internal representation 612 to populate the stack 620 in the depicted embodiment, and ignore the closed partitions.

In the example scenario depicted in FIG. 6, all the partitions of the stream are members of the source set, so that the entire key range of the stream (integers between and maxKey) is represented in the stack 620. Entries 680 may be pushed onto the stack in an order based on the starting keys of the corresponding partitions in some embodiments. For example, as in FIG. 6, entries may be pushed on the stack in descending order of the starting keys. As a result, after the stack 620 has been populated, the entry 680A at the top of the stack (called "Etop") represents the partition with key range 0 to k1, the next entry 680B ("Enext") represents the partition with key range (k1+1) to k2, and so on, with the bottom entry 680N representing the partition with the key range ending in maxKey. In at least one embodiment, each stack entry may include an identifier of the corresponding source set partition (which may be passed as a parameter by the ARA for SMS control-plane API calls to merge/split the partition), and an indication of the key range of the corresponding source partition. In at least one embodiment, not all the keys of a key space need be consecutive, so that each partition (and its corresponding entry in stack 620) may indicate a corresponding key set rather than a key range. Entries may be pushed in ascending key order in some implementations. As indicated earlier, data structures other than stacks may be used in some embodiments.

In the following description of the iterative technique used by the ARA, the key range of the source partition corresponding to a stack entry may simply be referred to herein as the key range of the stack entry. To simplify the presentation, the size of the key ranges of all the partitions of the target set are assumed to be equal: that is, if the target partition counts is TC, the size of each target partition's key range is assumed to be (maxKey/TC). If (maxKey/TC) is not an integer, the nearest integer lower than (maxKey/TC) may be set as the target key range of some of the partitions, and the next integer higher than (maxKey/TC) may be set as the target key range for other target partitions, such that the entire key space is covered by the target partition set. It is noted that the iterative repartitioning technique does not require target partition key ranges to be equal (or nearly equal); target partition key ranges may differ substantially from each other in some cases, e.g., based on the factors that led to the generation of the repartitioning plan parameters.

Using the repartitioning parameters 650, the ARA 180 may iteratively pop entries from the stack 620, compare the key ranges of the popped entry 652 with the target key range, and take one or more actions indicated in table 654 based on the results of the comparison until, eventually, the target partition set has been created. If the key range of Etop entry 652 is equal to the target key range, or is within a tolerance level with respect to the target key range, the ARA may simply designate the source set partition represented by Enext as an acceptable partition for inclusion within the target set, as indicated in the first row of table 654.

If the Etop key range is smaller than the target key range, the ARA may determine the key range of the next entry Enext. If the combined key range of Etop and Enext is still smaller than (or equal to) the target key range, the ARA 180 may issue an SMS API call to merge the partitions corresponding to Etop and Enext, and push an entry corresponding to the merged partition onto the stack 620 (as indicated in the second row of table 654). If the combined key range of Etop and Enext exceeds the target key range, the ARA 180 may issue two SMS API calls as indicated in the third row of table 654. One API call may request a split of the partition represented by Enext into two partitions X1 and X2 such that the combined key range of Etop and X1 equals (or is within an acceptable range around) the target key range, and a second API call may request a merge of the partition represented by Etop with X1. A new stack entry corresponding to X2 may be pushed onto the stack. As indicated in the bottom row of table 654, if the Etop key range is larger than the target key range, the ARA 180 may invoke an SMS API call to split the partition represented by Etop into partitions Y1 and Y2 such that Y1 has the target key range, and push an entry representing Y2 onto the stack. The next iteration may then be initiated by popping the new entry on the top of the stack. Eventually, e.g., after all the entries of the stack have been popped, the keys of the source set of stream partitions may be remapped into the target set of the repartitioning plan.

Example Source and Target Partition Set Scenarios

Figure 7:
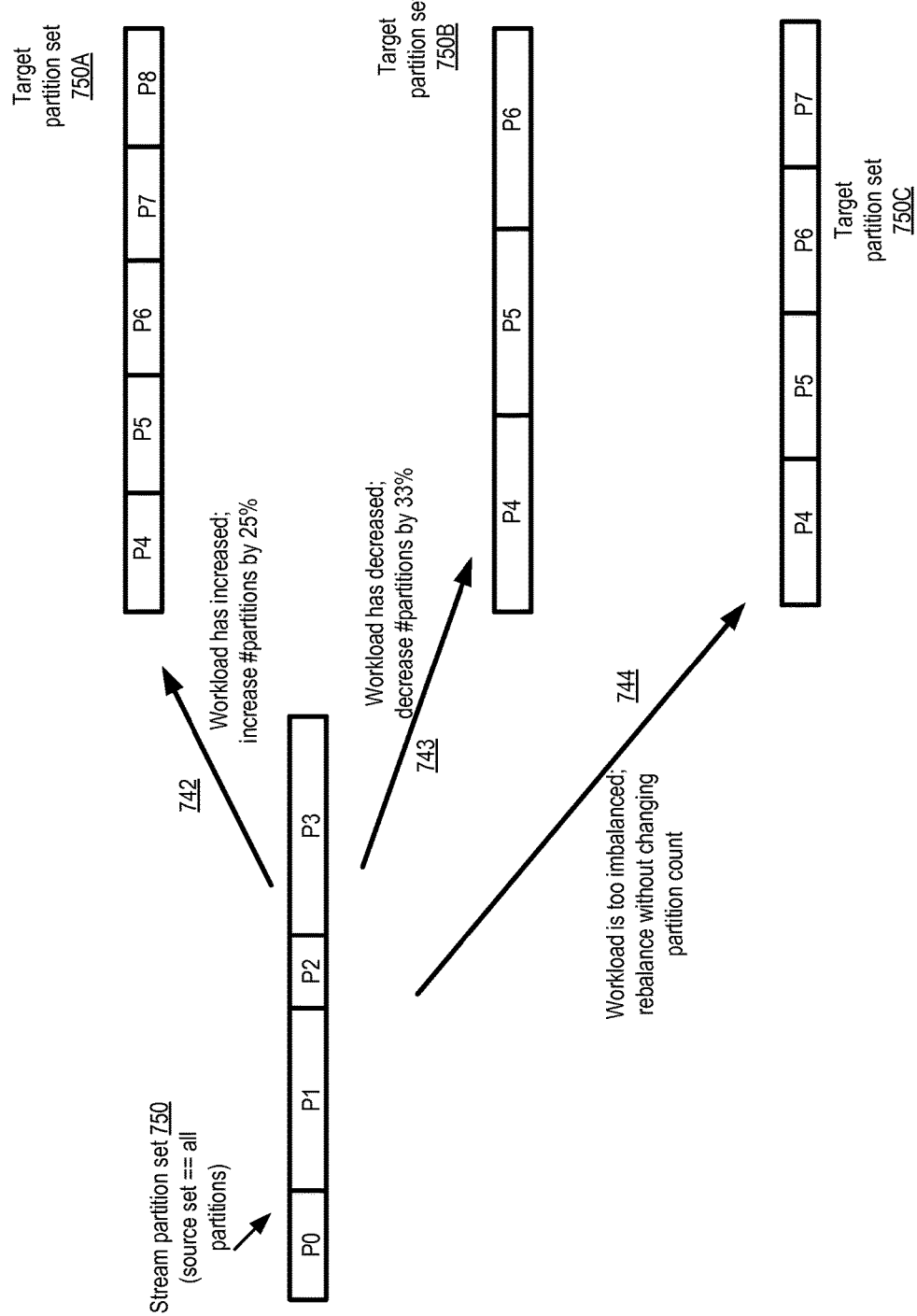
FIG. 7 illustrates examples of repartitioning operations in which all the existing partitions of a stream may be examined for scheduling possible splits or merges, according to at least some embodiments.

FIG. 7 illustrates examples of repartitioning operations in which all the existing partitions of a stream may be examined for scheduling possible splits or merges, according to at least some embodiments. A stream's partition set 750 includes four partitions P1, P1, P2 and P3. All four partitions are included in the source set identified by an ARA for repartitioning in the depicted embodiment. Each partition is assumed to have equivalent resource capacities (e.g., storage, processing and/or network capacity) designated by the SMS for its operations, and each partition of the target set is assumed to have a key range of the same size as the other partitions of the target set.

Three examples of high-level objectives for repartitioning are shown. In one scenario, indicated by the arrow labeled 742, the number of partitions is to be increased by 25% as a result of increased workload—e.g., the rate at which data records are submitted and/or retrieved has increased. As a result, the ARA determines that the target set is to include five partitions (P4 through P8), and initiates the necessary splits and/or merges to obtain the target partition set 750A. In a second scenario, the workload of the stream has decreased, and as a result the owner of the stream has requested a 33% decrease in the partition count, as indicated by arrow 743. Accordingly, the ARA determines that the target partition count is three, identifies the key ranges for the three partitions P4, P5 and P6, and initiates the necessary merges/splits to achieve target partition set 750B. In some cases, a client may be concerned about imbalanced partitions but may not necessarily want the partition count to be changed by the ARA. Accordingly as indicated by arrow 744 in the third example shown in FIG. 7, the client may request that the ARA simply rebalance the partition key space. The ARA may then set the target partition count to four, determine the key ranges for each of the four partitions P4-P7, and use the iterative technique described above to achieve a target partition set 750C in which the number of keys in any given partition's key range is equal to the number of keys in any other partition's key range.

Figure 8:
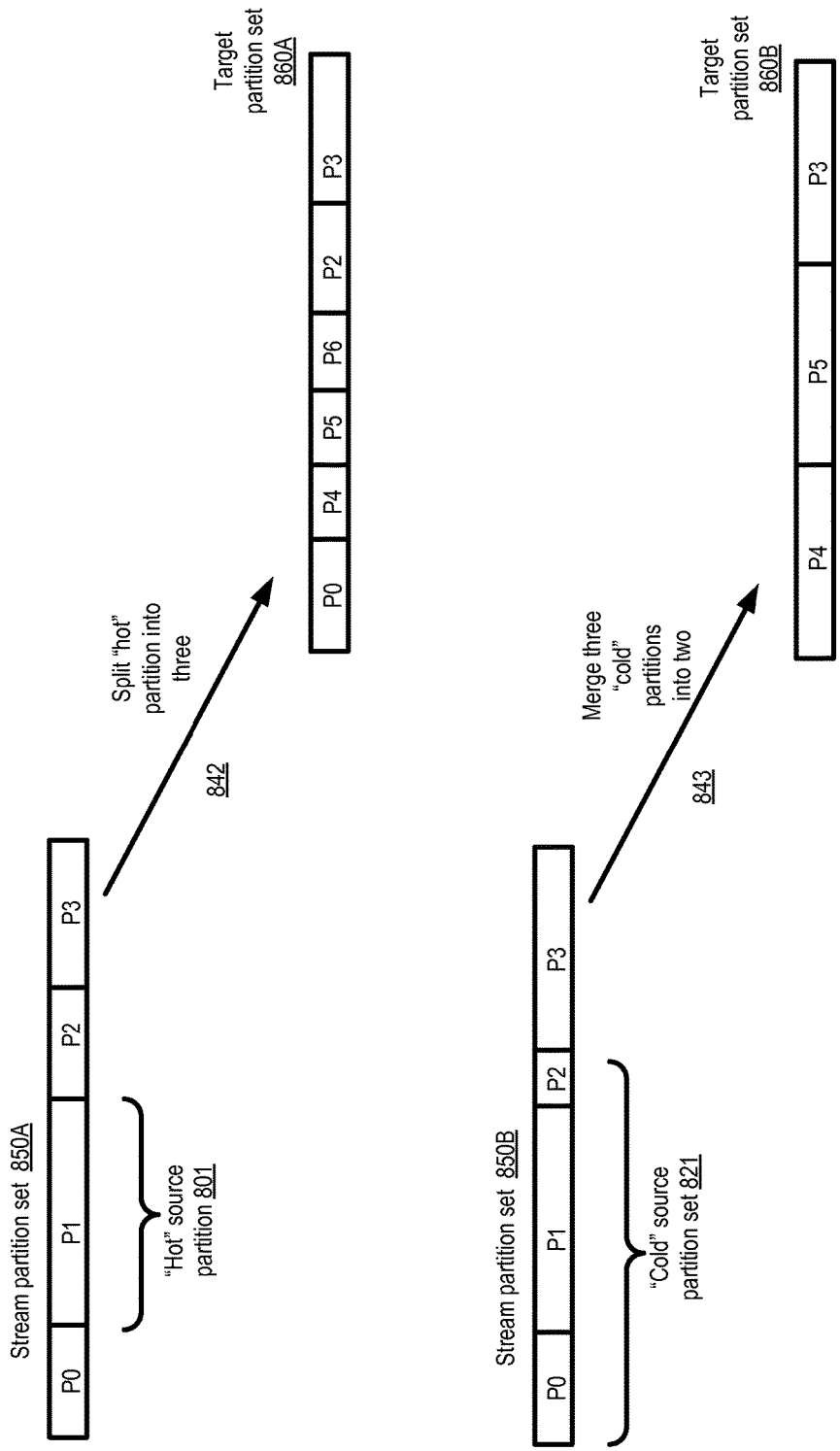
FIG. 8 illustrates examples of repartitioning operations in which an overloaded or under-utilized subset of partitions of a stream may be examined for scheduling possible splits or merges, according to at least some embodiments.

In some cases, repartitioning may be appropriate or required for only some of the partitions of a stream, so that not all the partitions of the stream may have be included in the source set identified by an ARA. FIG. 8 illustrates examples of repartitioning operations in which an overloaded or under-utilized subset of partitions of a stream may be examined for scheduling possible splits or merges, according to at least some embodiments. Among the partitions P0-P3 of stream partition set 850A, partition P1 has been identified as a "hot" or overloaded partition (e.g., because it has received a disproportionately high number of data records relative to the other partitions). The workloads of the remaining partitions P0, P2 and P3 may be in an acceptable range. As a result, either the client or the ARA may decide that only the hot partition P1 should be included in a source partition set 801 for repartitioning. The client or the ARA may determine the target number of partitions into which the hot partition should be split (three partitions in the depicted example), and use the iterative repartitioning technique to arrive at a target partition set 860A comprising the three original partitions P0, P2, P3 and three new partitions P4, P5, and P6, where the key range assigned to P1 has been split among P4, P5 and P6. Multiple overloaded partitions may be included in a source partition set identified by the ARA in some cases; for example, any partition whose workload exceeds the average workload of the stream's partitions by X % may be included in a source partition set in one example scenario. One or more of the key ranges of source set partitions may be non-adjacent to the key ranges of other partitions of the source set in some cases—for example, a source set may include two partitions, one partition with key range 500-999 and another with key range 1501-1750.

In some cases, the ARA may merge several partitions of a stream, while leaving other partitions unaffected. In stream partition set 850B, for example, partitions P0, P1 and P2 may have been identified as "cold", i.e., with lower workload levels than expected. In such a scenario, the ARA may include the cold partitions in its source partition set 821, determine that they should be replaced by two partitions P4 and P5, and initiate the needed merges and splits using the iterative technique described above. In some embodiments, the ARA may use performance metrics collected on a per-partition level to periodically identify hot partitions (those with workload levels above a threshold) and/or cold partitions (those with workload levels below a threshold), and initiate repartitioning operations to balance the workload across partitions as needed.

Methods for Automated Repartitioning

Figure 9A:
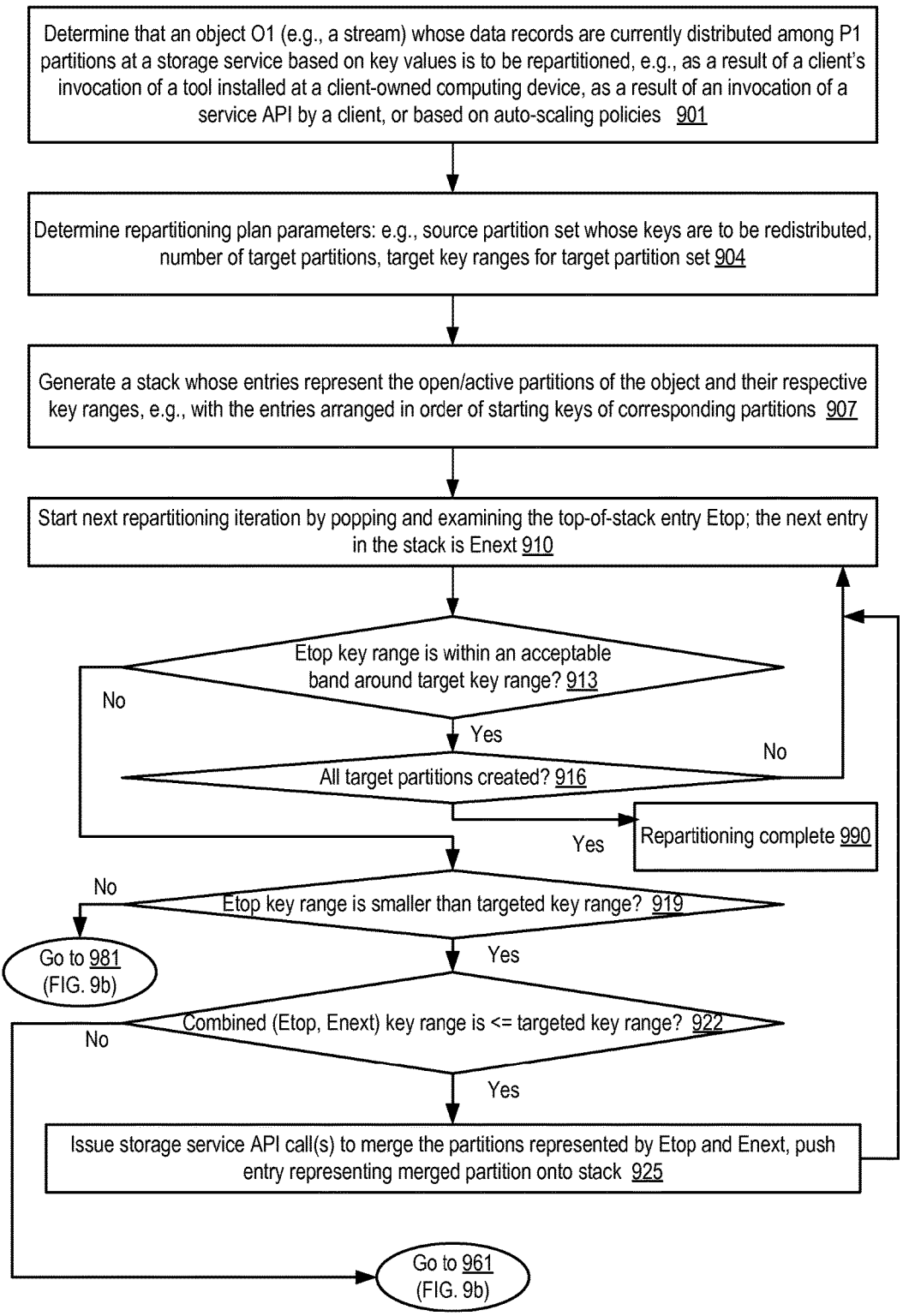
FIGS. 9a and 9b collectively illustrate a flow diagram detailing aspects of operations that may be performed by an automated repartitioning agent of a storage service such as an SMS, according to at least some embodiments.
Figure 9B:
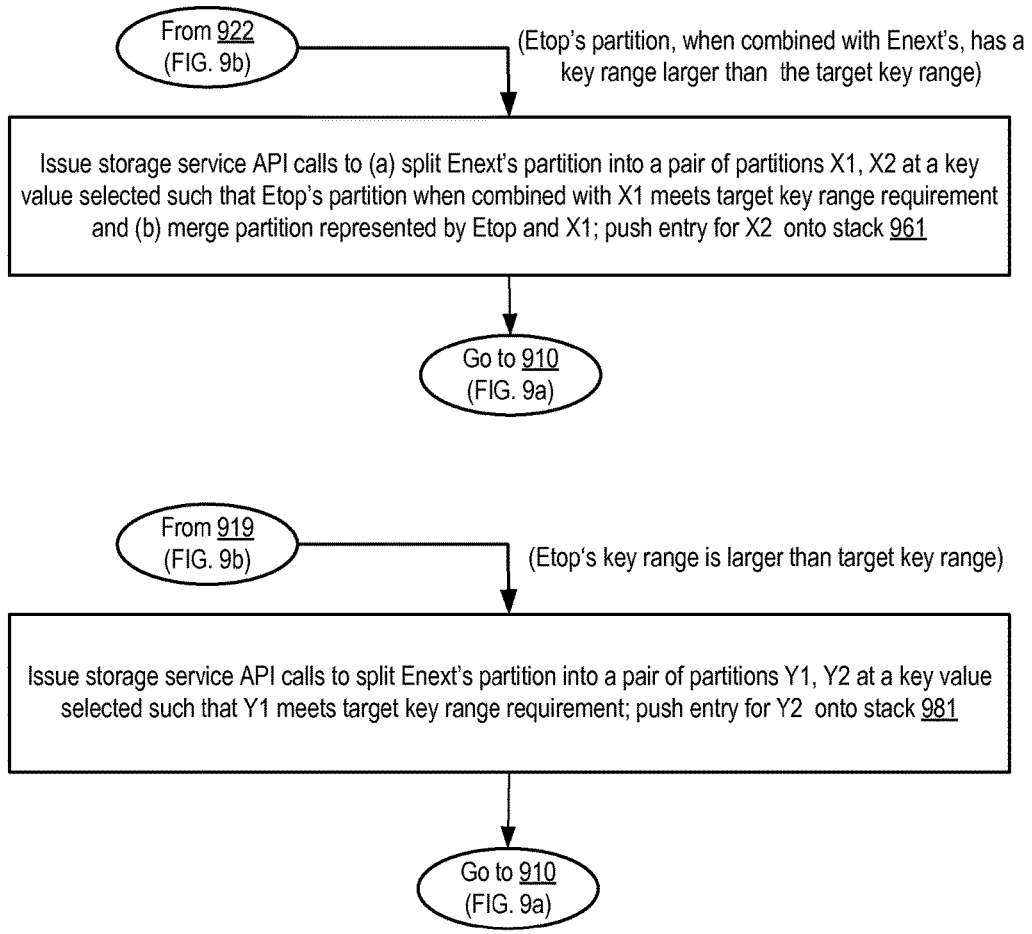

FIGS. 9a and 9b collectively illustrate a flow diagram detailing aspects of operations that may be performed by an automated repartitioning agent of a storage service such as an SMS, according to at least some embodiments. As shown in element 901 of FIG. 9a, a determination may be made by or at an automated repartitioning agent (ARA) that an object O1 (such as a stream) of a storage service implemented at a provider network is to be repartitioned. The storage service may implement a key-based partitioning scheme for its storage objects, so that for example respective contiguous sub-ranges of an integer key space may be assigned as the key ranges for individual partitions of the objects. The ARA may be implemented as a tool or utility that can be run at a computing device of choice, such as a client-owned laptop or desktop, or at a virtual machine of the provider network assigned to the client. In some embodiments, the ARA's functionality may be invoked via a programmatic interface of the storage service, e.g., the ARA may be implemented within the control-plane of an SMS. Auto-scaling policies may be designated to various objects of the storage system in some embodiments, e.g., policies that require the performance for specified types of storage operations to meet specified criteria, and the ARA may be activated by the service to enforce or implement the auto-scaling policies. In at least some embodiments, performance metrics at the partition level may be available for various storage system objects, instead of or in addition to metrics available at the object level. Metrics at either (or both) granularity levels (the object level and/or the partition level) may influence the repartitioning decisions made by the ARA in various embodiments.

In the depicted embodiment, the ARA may determine various parameters of a repartitioning plan (element 904), such as the particular source partitions whose keys are to be redistributed among a number of partitions of a target set and the key ranges of each of the partitions of the target set. In embodiments in which partitions may be in various states (such as open or closed states), only those partitions that are in a selected state (e.g., open) may be considered for inclusion in the source set. In at least one embodiment, the ARA may also determine an acceptable band (or tolerance range) of key ranges for target set partitions—e.g., if a particular target key range is 100 keys, the ARA may determine that a source partition with between 98 and 102 keys may be close enough to the target key range that no splits or merges of the source partition are required.

In the embodiment depicted in FIG. 9a and FIG. 9b, a stack representation of the source set of partitions may be generated by the ARA (element 907). In order to generate the stack, the ARA may have to interact with the storage service programmatically in some embodiments, and select the partitions that to be included in the stack from among a larger set of partitions included in an internal representation maintained by the service (e.g., a DAG or TreeMap which includes both closed and open partitions). Each entry of the stack may represent one partition of the source set, and may include respective fields indicating the partition identifier (which may be usable as parameters of service API calls to merge or split partitions) and the current key range of the partition.

Having populated the stack, the ARA may begin an iterative process of repartitioning the object (element 910). An iteration may begin by the ARA popping an entry (Etop) from the top of the stack; the entry next to Etop may be referred to as Enext. Etop's key range may be compared to a target key range determined for the next target partition to be created. If Etop's key range is within an acceptable band around the target key range, as detected in element 913, no additional operations or API calls may be required with respect to the source partition represented by Etop. If all the target set partitions have been created (as determined in element 916), the repartitioning iterations may be deemed complete (element 990). If, however, entries remain on the stack and not all the target partitions have been created, the next repartitioning iteration may be begun by popping the new top-of-stack entry, and the operations corresponding to elements 910 onwards may be repeated.

If, in the operations corresponding to element 913, the ARA determines that the key range of Etop is not within the acceptable range with respect to the target key range, a merge and/or a split of the corresponding partition may be required. If Etop's key range is smaller than the targeted key range (as determined in element 919), the ARA may examine the combined key range of Etop and Enext. If the combined range is smaller than or equal to the target key range (as determined in element 922), the ARA may issue one or more API requests to the control-plane of the storage service to merge the two partitions corresponding to Etop and Enext in the depicted embodiment (element 925). In addition, a new entry representing the merged partition may be pushed onto the stack. The next iteration of repartitioning may then be begun by repeating the operations of element 910 onwards.

If the ARA determines (in the operations corresponding to element 922) that the combined key range of Etop and Enext exceed the target key range, a different set of repartitioning actions may be performed as indicated in element 961 of FIG. 9b. First, in the depicted embodiment, Enext's partition may be split into two partitions X1 and X2 at a splitting key selected by the ARA such that when Etop's key range is combined with X1's key range, the resulting key range is equal to the target key range (or within an acceptable band around the target key range). Next, the ARA may issue the appropriate API calls to the storage service control-plane to merge Etop's partition with X1. In addition, an entry corresponding to X2 may be pushed onto the stack. The next iteration may then be begun by repeating the operations corresponding to element 910 onwards.

The operations corresponding to elements 922 onwards may be performed if Etop's key range is smaller than the target key range, as determined in element 919. If Etop's key range is larger than the target key range, the operations corresponding to element 981 of FIG. 9b may be performed instead. The ARA may issue the appropriate storage service API calls to split the partition corresponding to Etop into two partitions Y1 and Y2, such that Y1's key range is equal to the target key range. An entry corresponding to Y2 may then be pushed onto the stack, and the next repartitioning iteration may then be begun by repeating the operations corresponding to element 910 onwards.

It is noted that in various embodiments, operations other than those illustrated in the flow diagram of FIGS. 9a and 9b may be used to implement at least some of the techniques for supporting automated repartitioning of storage objects such as streams. For example, in one embodiment, instead of first splitting Enext's partition and then performing a merge, as indicated in element 961 of FIG. 9b, Etop's and Enext's partitions may first be merged and then split to form target partitions of the appropriate size. Some of the operations shown may not be implemented in some embodiments, may be performed in parallel rather than sequentially, or may be implemented in a different order than illustrated in FIG. 8.

Use Cases

The techniques described above, of implementing an automated repartitioning capability for a stream management service (or for other types of storage services) of a provider network may be very useful in a variety of scenarios. Many large scale storage systems may implement key-based partitioning for load balancing, high availability and other purposes. To support large objects such as streams that may comprise millions of data records, very large key spaces may be used for partitioning by some services. The key spaces may be so large that even if the service allows customers to request splits or merges, the customers may find it difficult to select the correct key values to be used to request such partitioning changes. Instead, clients may simply want to let the storage service handle the details of repartitioning, given some higher level client-indicated goals such as a desire to rebalance the workloads of different partitions, or to add more partitions (and resulting resources) to a given data object. Automated repartitioning tools that provide simple interfaces for clients to specify such high level objectives, and can be run at computing devices owned by the client, may make it much easier for clients to manage their large data sets.

Illustrative Computer System

Figure 10:
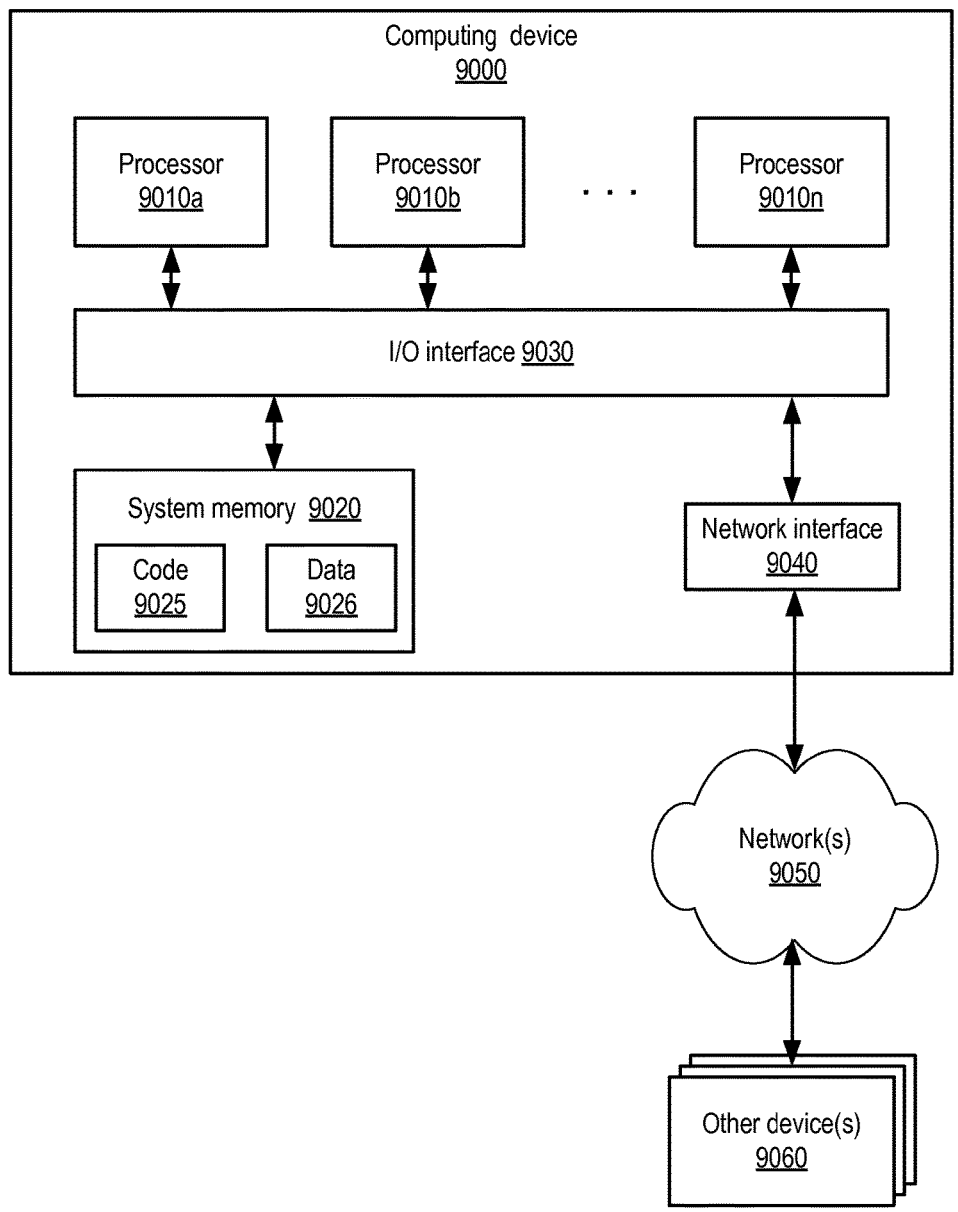
FIG. 10 is a block diagram illustrating an example computing device that may be used in at least some embodiments.

In at least some embodiments, a server that implements one or more of the techniques described above for supporting automated repartitioning of storage objects such as streams may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9b, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9b for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more control-plane components implemented by one or more hardware processors coupled to respective memory, wherein the one or more control-plane components are included within a stream management service (SMS) of a provider network, wherein data records of a particular stream managed by the SMS are distributed among multiple ones of a first plurality of partitions, wherein individual partitions of the first plurality of partitions comprise data records with key values in a respective contiguous key range of a key-space; and
an automated repartitioning agent (ARA) implemented by one or more hardware processors coupled to respective memory;
wherein the ARA is configured to:
determine a repartitioning plan for the particular stream based at least on client-indicated workload balancing goals, wherein the plan includes: (a) an indication of a source set comprising one or more partitions of the particular stream whose keys are to be redistributed among a target set comprising a target number of partitions and (b) a respective target key range for individual partitions of the target set; and implement one or more repartitioning iterations until the keys of the source set of partitions have been redistributed among the target set of partitions, wherein a particular repartitioning iteration of the one or more repartitioning iterations comprises:

compare individual ones of the key ranges of partitions of the source set to individual ones of target key ranges of partitions of the target set, wherein different key ranges of the partitions of the source set that are compared to the individual target key ranges of the partitions of the target set comprise different contiguous ranges of key values for data records stored in the source set, and wherein different target key ranges of the partitions of the target set that are compared to the individual key ranges of the partitions of the source set comprise different contiguous ranges of key values for data records to be stored in the target set, wherein the data records to be stored in the target set include the data records stored in the source set; and perform, based at least in part on the comparison of the individual ones of the key ranges of the partitions of the source set to the individual ones of the target key ranges of the partitions of the target set, one or more repartitioning actions selected from a set of actions which includes: (a) submitting a request to the one or more control-plane components to merge a given partition of the source set of partitions with another partition of the source set of partitions, (b) submitting a request to the one or more control-plane components to split a given partition of the source set of partitions at a selected key value of one of the key ranges of the partitions of the source set, or (c) determining, based on a given partition of the source set of partitions meeting an acceptance criterion for the target set of partitions, that the given partition does not need to be split or merged.

2. The system as recited in claim 1, wherein at least a portion of the ARA is installed at a computing device located outside the provider network.

3. The system as recited in claim 1, wherein the source set is identified based at least in part on the performance data associated with client-requested operations directed to the particular stream.

4. The system as recited in claim 3, wherein the performance data includes per-partition performance metrics for at least one partition of the source set.

5. The system as recited in claim 1, wherein the ARA is configured to:

select the respective target key ranges for the individual partitions of the target set in accordance with a workload balancing policy, and wherein a number of keys included in a first target key range corresponding to a first partition of the target set is equal to a number of keys included in a second target key range corresponding to a second partition of the target set.

6. A method, comprising:

performing, by one or more computing devices comprising respective hardware processors and memory:

determining, by an automated repartitioning agent (ARA) of a storage service of a provider network, a repartitioning plan for a particular object managed by the storage service based at least on client-indicated workload balancing goals, wherein data records of the particular object are distributed among multiple ones of a first plurality of partitions based on respective key values corresponding to individual ones of the data records, and wherein the plan includes: (a) an indication of a source set comprising one or more partitions of the particular object whose keys are to be redistributed among a target set comprising a target number of partitions and (b) a respective target key set for individual partitions of the target set; and implementing, by the ARA, one or more repartitioning iterations until the keys of the source set of partitions have been redistributed among the target set of partitions, wherein a particular repartitioning iteration of the one or more repartitioning iterations comprises:

comparing individual ones of key sets of partitions of the source set to individual ones of target key sets of partitions of the target set, wherein different key sets of the partitions of the source set that are compared to the individual target key sets of the partitions of the target set comprise different contiguous ranges of key values for data records stored in the source set, and wherein different target key sets of the partitions of the target set that are compared to the individual keys sets of the partitions of the source set comprise different contiguous ranges of key values for data records to be stored in the target set, and wherein the data records to be stored in the target set of partitions include the data records stored in the source set; and performing, based at least in part on said comparing the individual ones of the key sets of the partitions of the source set to the target key sets of the partitions of the target set, one or more repartitioning actions selected from a set of actions which includes: (a) submitting a request to the storage service to merge a given partition of the source set of partitions with a different partition of the source set of partitions, (b) submitting a request to the storage service to split a given partition of the source set of partitions at a selected key value of one of the key ranges of the partitions of the source set, or (c) determining, based on a key set of a given partition of the source set of partitions meeting an acceptance criterion with respect to one of the target key sets, that the given partition does not need to be split or merged.

7. The method as recited in claim 6, wherein at least a portion of the ARA is installed at a computing device located outside the provider network.

8. The method as recited in claim 6, wherein at least a portion of the ARA is implemented at a computing device of the provider network.

9. The method as recited in claim 6, further comprising performing, by the ARA:

receiving a repartitioning request from a client of the storage service via a programmatic interface, wherein the repartitioning plan is determined in response to the repartitioning request.

10. The method as recited in claim 6, further comprising:

collecting, by one or more metrics collectors of the storage service, performance data associated with client-requested operations performed on the particular object, wherein the source set is identified based at least in part on the performance data.

11. The method as recited in claim 10, wherein the performance data includes per-partition performance metrics for at least one partition of the source set.

12. The method as recited in claim 6, further comprising:
selecting, by the ARA, the respective target key set for the individual partitions of the target set in accordance with a workload balancing policy, and wherein a number of keys included by the ARA in a first target key set corresponding to a first partition of the target set is equal to a number of keys included by the ARA in a second target key set corresponding to a second partition of the target set.

13. The method as recited in claim 6, wherein the source set includes a first partition and a second partition, wherein a number of keys in a key set of the first partition differs from a number of keys in a key set of the second partition, further comprising:
receiving, by the ARA, a request to rebalance partitions of the particular object without changing the number of partitions into which the particular object is divided, wherein the repartitioning plan is generated in response to the request to rebalance.

14. The method as recited in claim 6, further comprising:
receiving, by a component of the storage service via a programmatic interface, an indication of an auto-scaling policy to be applied to the particular object, wherein the repartitioning plan is generated by the ARA in accordance with the auto-scaling policy.

15. The method as recited in claim 6, wherein the one or more repartitioning iterations occur in order of lowest key values to highest key values of the corresponding partitions of the source set of partitions.

16. The method as recited in claim 6, wherein the storage service comprises a stream management service (SMS), and wherein the particular object comprises a stream object established to store data records transmitted to an ingestion layer of the SMS from one or more data producers.

17. A non-transitory computer-accessible storage medium storing program instructions that when executed on one or more processors implements an automated repartitioning agent (ARA) of a storage service and cause the ARA to:
determine a repartitioning plan for a particular storage object of a storage service based at least on client-indicated workload balancing goals, wherein data records of the particular object are distributed among multiple ones of a first plurality of partitions based on respective key values corresponding to individual ones of the data records, and wherein the repartitioning plan includes at least a target number of partitions into which keys of a source set comprising one or more partitions of the particular object are to be redistributed; and
implement one or more repartitioning iterations until the keys of the source set of partitions have been redistributed among a target set of partitions comprising the target number of partitions, wherein a particular repartitioning iteration of the one or more repartitioning iterations comprises:
comparing individual ones of key sets of partitions of the source set to individual ones of target key sets of partitions of the target set, wherein different key sets of the partitions of the source set that are compared to the individual target key sets of the partitions of the target set comprise different contiguous ranges of key values for data records stored in the source set, and wherein different target key sets of the partitions of the target set that are compared to the individual keys sets of the partitions of the source set comprise different contiguous ranges of key values for data records to be stored in the target set, and wherein the data records to be stored in the target set include the data records stored in the source set; and
performing, based at least on said comparing the individual ones of the key sets of the partitions of the source set to the target key sets of the partitions of the target set, one or more repartitioning actions selected from a set of actions which includes: (a) submitting a request to the storage service to merge a given partition of the source set of partitions with a different partition of the source set of partitions, (b) submitting a request to the storage service to split a given partition of the source set of partitions at a selected key value of one of the key ranges of the partitions of the source set, or (c) determining, based on a key set of a given partition of the source set of partitions meeting an acceptance criterion with respect to one of the target key sets, that the given partition does not need to be split or merged.

18. The non-transitory computer-accessible storage medium as recited in claim 17, wherein the one or more repartitioning iterations occur in order of lowest key values to highest key values of the corresponding partitions of the source set.

19. The non-transitory computer-accessible storage medium as recited in claim 17, wherein the storage service comprises a stream management service (SMS), and wherein the particular storage object comprises a stream object established to store data records transmitted to an ingestion layer of the SMS from one or more data producers.

20. The non-transitory computer-accessible storage medium as recited in claim 17, wherein the source set is identified based at least in part on performance data associated with client-requested operations directed to the particular object.

21. The non-transitory computer-accessible storage medium as recited in claim 17, wherein the ARA is configured to:
select a respective target key set for individual partitions of the target set in accordance with a workload balancing policy, wherein a number of keys included in a first target key set corresponding to a first partition of the target set is equal to a number of keys included in a second target key set corresponding to a second partition of the target set.

* * * * *